United States Patent [19]
Morioka et al.
[11] Patent Number: 4,877,558
[45] Date of Patent: Oct. 31, 1989

[54] METHOD OF TREATING RADIOACTIVE ION-EXCHANGE RESINS BY OXIDATIVE DECOMPOSITION

[75] Inventors: Takayuki Morioka; Nobuyuki Motoyama; Hiroshi Hoshikawa; Takeo Takahashi; Sizuo Suzuki; Tuyoshi Ishikawa; Takanori Toyoshi; Toshio Uede, all of Kanagawa, Japan

[73] Assignee: Fuji Electric Co., Ltd., Kawasaki, Japan

[21] Appl. No.: 43,723

[22] Filed: Apr. 29, 1987

[30] Foreign Application Priority Data

Aug. 20, 1986 [JP] Japan ............................... 61-194192

[51] Int. Cl.[4] .......................... G21F 9/00; C02F 1/72; C02F 1/68

[52] U.S. Cl. .................................... 252/626; 210/682; 210/759; 210/763; 210/908; 252/632; 252/186.28

[58] Field of Search ........................ 252/626, 631, 632; 210/759, 683, 760, 908, 912, 763, 721, 724; 422/159

[56] References Cited

U.S. PATENT DOCUMENTS

| | | | |
|---|---|---|---|
| 3,914,388 | 10/1975 | Cathers et al. | 423/249 |
| 4,108,746 | 8/1978 | Mill et al. | 204/158 R |
| 4,180,603 | 12/1979 | Howell, Jr. | 427/386 |
| 4,235,738 | 11/1980 | Knotik et al. | 252/632 |
| 4,255,305 | 3/1981 | Howell, Jr. | 428/418 |
| 4,340,490 | 7/1982 | Junkermann et al. | 210/759 |
| 4,370,241 | 1/1983 | Junkermann et al. | 210/759 |
| 4,377,508 | 3/1983 | Rothberg | 252/631 |
| 4,624,792 | 11/1986 | Yamanaka et al. | 210/759 |
| 4,693,833 | 9/1987 | Toshikuni et al. | 210/759 |

FOREIGN PATENT DOCUMENTS

| | | | |
|---|---|---|---|
| 379250 | 12/1985 | Fed. Rep. of Germany . | |
| 379251 | 12/1985 | Fed. Rep. of Germany . | |
| 1446 | 1/1982 | Japan . | |
| 191599 | 11/1982 | Japan . | |
| 52599 | 3/1983 | Japan | 252/631 |
| 72099 | 4/1983 | Japan . | |
| 184898 | 10/1984 | Japan | 252/631 |
| 184900 | 10/1984 | Japan | 252/631 |
| 1574795 | 9/1980 | United Kingdom . | |
| 8500922 | 2/1985 | World Int. Prop. O. . | |

*Primary Examiner*—Howard J. Locker
*Attorney, Agent, or Firm*—Sughrue, Mion, Zinn, Macpeak & Seas

[57] ABSTRACT

A method of oxidatively decomposing a radioactive ion-exchange resin is described, the method comprising oxidatively decomposing a radioactive ion-exchange resin containing an anion-exchange resin with hydrogen peroxide used as an oxidizing agent in the presence of iron and copper ions used as catalysts, wherein the weight ratio of hydrogen peroxide to the ion-exchange resin, that is the ratio of the net weight of hydrogen peroxide to the dry weight of the ion-exchange resin containing an anion-exchange resin, is held to be no higher than 17 and the pH of the reaction system is adjusted to be within the range of 0.5 to 6, or citric acid ions are preliminarily adsorbed on the radioactive ion-exchange resin before it is subjected to decomposition treatment or citric acid ions coexist with the radioactive ion-exchange resin in the oxidatively decomposing system, and an apparatus used for conducting the method is also described.

6 Claims, 12 Drawing Sheets

CONDITIONS

| | |
|---|---|
| ANION-EXCHANGE RESIN : | 4g (DRY WEIGHT) |
| INITIAL Fe CONCENTRATION : | 0.002 M |
| INITIAL Cu CONCENTRATION : | 0.01 M |
| DECOMPOSITION TEMPERATURE : | 95°C |
| DECOMPOSITION TIME : | 2 HOURS |
| pH : | 2 |

CONDITIONS

| | |
|---|---|
| $H_2O_2$/RESIN RATIO : | 10 |
| INITIAL Cu CONCENTRATION : | 0.01 M |
| pH : | 2 |
| DECOMPOSITION TIME : | 2 HOURS |
| DECOMPOSITION TEMPERATURE : | 95°C |
| ANION-EXCHANGE RESIN : | 4 g (DRY WEIGHT) |

CONDITIONS

| | |
|---|---|
| $H_2O_2$/RESIN RATIO : | 10 |
| ANION-EXCHANGE RESIN : | 4 g (DRY WEIGHT) |
| pH : | 2 |
| DECOMPOSITION TEMPERATURE : | 95° C |
| DECOMPOSITION TIME : | 2 HOURS |

CONDITIONS

| | |
|---|---|
| $H_2O_2$/RESIN RATIO : | 10 |
| ANION-EXCHANGE RESIN : | 4g (DRY WEIGHT) |
| pH : | 2 |
| DECOMPOSITION TEMPERATURE : | 95°C |
| DECOMPOSITION TIME : | 2 HOURS |

| SYMBOLS | INITIAL Fe ION CONCENTRATION |
|---|---|
| ○ | 0.001 |
| ● | 0.002 |
| ◑ | 0.005 |
| △ | 0.01 |
| ▲ | 0.02 |
| ◭ | 0.03 |

CONDITIONS

| | |
|---|---|
| $H_2O_2$/RESIN RATIO : | 10 |
| ANION-EXCHANGE RESIN : | 4 g (DRY WEIGHT) |
| DECOMPOSITION TEMPERATURE : | 95°C |
| DECOMPOSITION TIME : | 2 HOURS |
| pH : | 2 |
| INITIAL Cu ION CONCENTRATION : | 0.01 M |

METHOD OF TREATING RADIOACTIVE ION-EXCHANGE RESINS BY OXIDATIVE DECOMPOSITION

BACKGROUND OF THE INVENTION

The present invention relates to a method of chemical decomposition by which the volumes of spent radioactive ion-exchange resins (hereinafter sometimes referred to as waste resins) originating from atomic energy facilities can be reduced.

Ion-exchange resins are extensively used in many applications such as purification of water, treatment of wastewaters, and separation of various elements. They are also used in large quantities in the field of atomic energy for the purpose of purifying cooling water in nuclear reactors and treating liquid wastes. Therefore, treatment and disposal of spent waste ion-exchange resins containing radioactive substances has been a serious concern in this field.

The method in common use in the technology of disposal of radioactive waste ion-exchange resins is to dehydrate the resins, solidify them by incorporation in cements, plastics, etc., place the solidified wastes in containers, and store them for a prescribed number of years, often almost perpetually. However, the waste resins treated by this method are not reduced significantly in volume and have posed substantial problems in the area of waste storage and management.

As described above, no really satisfactory method for treating or finally disposing of the variety of solid wastes that result from the operation of nuclear power plants has yet been established. One of the serious problems that remain to be solved is how to reduce the volume of ion-exchange resins that are discarded after they have been used in the purification of liquid media.

Several methods, including combustion (incineration), pyrolysis, and acid decomposition have so far been proposed as techniques for reducing the volumes of waste ion-exchange resins, but none of these have proved to be a complete solution to the problem. The combustion method has the advantage of achieving rapid treatment but, at the same time, it requires complicated off-gas lines for handling dust and tars, and/or produces volatile radioactive compounds. The last-mentioned problem is absent from the pyrolysis method, but, on the other hand, it yields high residual contents of carbonaceous materials, and still requires complicated flow systems as in the case of the incineration method. In the acid decomposition method, up to about 90% of the spent ion-exchange resins can be decomposed by successive treatments with concentrated sulfuric acid and nitric acid at a temperature of about 260° C. Although this method is free from any of the problems associated with the first two methods, it has the disadvantage of generating NOx and SOx. Furthermore, the reaction vessel must be made of an expensive material such as tantalum that is capable of withstanding the extremely high temperatures employed. As a further problem, the volume of the waste resins being treated cannot be reduced to the desired extent, since large quantities of salts form during neutralization of the reaction solution.

In order to avoid this problem, a method of decomposing waste resins at about 100° C. using hydrogen peroxide and an iron catalyst has been described in Japanese Patent Application (OPI) No. 1446/82 (the term "OPI" as used herein means an "unexamined published Japanese patent application"). This method readily achieves up to 95% decomposition if the waste resin is a cation-exchange resin, but the decomposition of an anion-exchange resin is no higher than 90%. To overcome this disadvantage, it has been proposed that a combination of iron and copper ions be used as a catalyst when the waste resin is decomposed by oxidation with hydrogen peroxide (Japanese Patent Application (OPI) No. 44700/84). This approach achieves at least 95% decomposition of anion-exchange resins, but if the amount of feed (i.e., anion-exchange resin) is increased, organic sludge containing iron and copper ions will form. Furthermore, the decomposition of waste resins by this method has been found to be highly dependent on the pH of the reaction solution, notwithstanding the previously held view that good decomposition is achieved within the pH range of 3 to 11, with particularly good results being attained in the neighborhood of neutrality. If the organic sludge is formed in a large quantity, it will be accumulated in the reaction vessel (reactor) or pipes to form "secondary" wastes which require another treatment, and may even cause a problem with transportation.

Other problems exist in the method of decomposing waste resins with hydrogen peroxide using iron and copper ions as catalysts. First of all, the reaction rate is very slow (at least one to two hours is necessary to convert the waste resin to inorganic matter), and a reactor of large capacity is required. Secondly and because of this slow reaction rate, decomposition must be performed under fairly $H_2O_2$-rich conditions. Since the running cost of this method is essentially determined by the amount of hydrogen peroxide used, it is important both technically and economically to achieve decomposition with the least possible amount of hydrogen peroxide used.

The prior art technology also has another problem that has to be solved before it can be employed in practical applications, viz., leakage of radioactivity from mechanical seals in the agitating and mixing apparatus used for achieving accelerated decomposition reaction.

SUMMARY OF THE INVENTION

An object, therefore, of the present invention is to provide a method by which a radioactive ion-exchange resin, and in particular, a radioactive anion-exchange resin, can be decomposed with hydrogen peroxide used as an oxidizing agent in the presence of iron and copper ions used as catalysts with high percent decomposition being achieved in a short period of treatment with low consumption of hydrogen peroxide and the production of organic sludge being held to minimum levels.

Another object of the present invention is to provide an apparatus that can be used to implement the aforementioned method of decomposing a radioactive ion-exchange resin.

The first object of the present invention can be attained by a method of oxidative decomposition of a radioactive ion-exchange resin, and, in particular, a radioactive anion-exchange resin with hydrogen peroxide used as an oxidizing agent in the presence of iron and copper ions used as catalysts, wherein the weight ratio of hydrogen peroxide to the ion-exchange resin, that is, the ratio of the net weight of hydrogen peroxide to the dry weight of the anion-exchange resin or a mixture thereof with a cation-exchange resin to be decomposed, is held to be no higher than 17 (i.e., 17/1) and (1)

the pH of the reaction system is adjusted to be within the range of 0.5 to 6, or (2) citric acid ions are preliminarily adsorbed on the waste ion-exchange resin before it is subjected to decomposition treatment or citric acid coexists with the waste ion-exchange resin in the oxidatively decomposing system.

The waste ion-exchange resin may be crushed before the addition of the oxidizing agent and the catalyst.

The first object of the present invention is also attained in a manner by crushing the waste ion-exchange resin into fine particles when or before it is mixed with hydrogen peroxide and the decomposition catalysts. The waste ion-exchange resin may be one adsorbing citric acid ions.

DETAILED DESCRIPTION OF THE INVENTION

Figure 2:
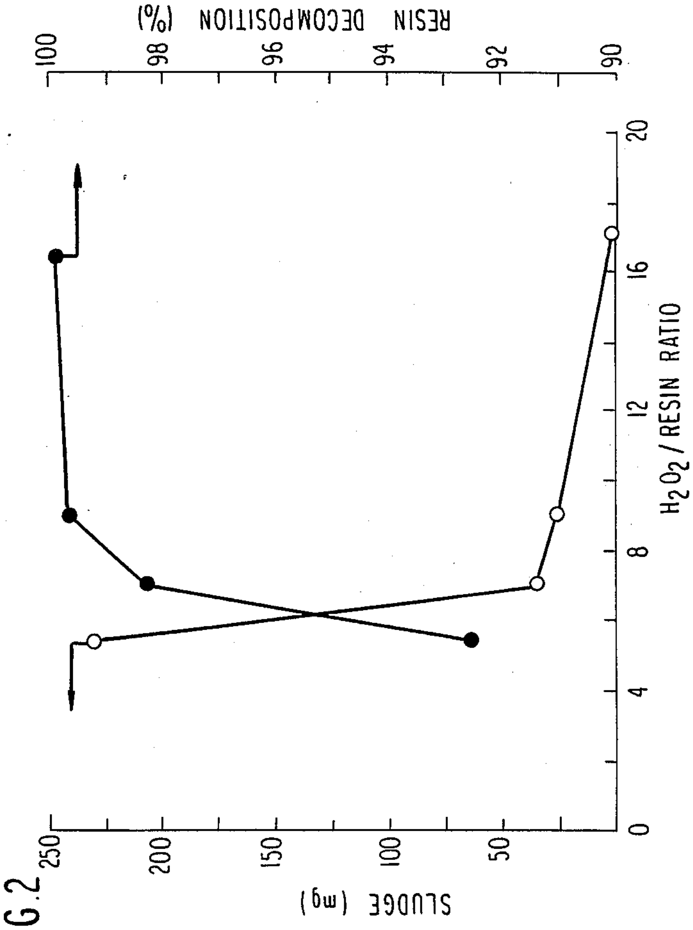
FIG. 2 is a graph showing the relationship between the $H_2O_2$/resin ratio, sludge weight, and percent resin decomposition.

The concentration of the aqueous solution of hydrogen peroxide to be added to the reaction system of oxidative decomposition is not limited to any particular value and conventional 30% or 60% hydrogen peroxide may satisfactorily be used. The method of the present invention is carried out with the ratio of $H_2O_2$ (on a net weight basis) to the ion-exchange resin feed (dry weight basis) being adjusted to no higher than 17 (i.e., 17/1; hereinafter, the various ratios to which reference is made are expressed as single numbers). The method of the present invention may be carried out within the range of 17 to 3, preferably 17 to 4, more preferably 10 to 4 in $H_2O_2$/resin ratio. Under $H_2O_2$-rich conditions, for example, $H_2O_2$/resin ratio is higher than 20, the method of the present invention need not be used and an appropriate combination of iron and copper catalysts can achieve efficient decomposition of the waste ion-exchange resin while forming a reduced amount of organic sludge.

Oxidative reaction should be carried out with the waste ion-exchange resin being dispersed or suspended in water. The volume of the reaction solution is desirably within the range of from about 10 ml to about 30 ml per gram of dry resin.

The iron and copper ions functioning as catalysts are preferably derived from water-soluble salts such as sulfates, nitrates and chlorides, such as $FeSO_4$, $FeSO_4.7H_2O$, $Fe(SO_4)(NH_4)_2SO_4.6H_2O$, $Fe(NH_4)(SO_4)_2.12H_2O$, $CuSO_4$, $CUSO_4.5H_2O$, etc. The concentration of iron catalyst used in the reaction system of oxidative decomposition is preferably within the range of from 0.0005 to 0.02 M, and more preferably from 0.002 to 0.15 M. The concentration of copper catalyst is preferably within the range of from 0.002 to 0.15 M, and more preferably from 0.005 to 0.1 M. If these conditions are used, better results are attained in terms of sludge formation and decomposition efficiency.

In one embodiment of the present invention, the $H_2O_2$/resin ratio is selected to have a value of no higher than 17 and the pH of the reaction system of oxidative decomposition is selected within a value of from 0.5 to 6, and preferably from 1 to 5. The pH value of the reaction system is controlled using, for example, $H_2SO_4$ solution of 1 N, 0.1 N, and 0.05 N and NaOH solution of 0.1 N and 0.05 N. The pH value is measured with pH meter. Using $H_2SO_4$ solution and NaOH solution, the pH value is controlled roughly at the initial steps and subsequently controlled strictly with repeated measurements to obtain a desired pH value.

In another embodiment, the $H_2O_2$/resin ratio is selected to have a value of no higher than 17, and decomposition of a radioactive ion-exchange resin with $H_2O_2$ in the presence of copper and iron catalysts is effected after the resin is subjected to ion-exchange for citric acid ions in the form of either citric acid or a salt thereof, e.g., sodium citrate, etc. Alternatively, the oxidative decomposition of a radioactive ion-exchange resin is carried out under a pH value of no higher than 17 and in the presence of either citric acid or a salt thereof.

By the coexistence of a citric acid or a salt thereof, it is meant that the radioactive ion-exchange resin adsorbs the citric acid ions in an amount of 70% or more, preferably 80% or more, and most preferably 90% or more based on a total ion-exchangeable ability of ion-exchange resin to be treated, the ion-exchangeable ability being represented by an equivalent per gram.

The anion-exchange resin used in the present invention preferably includes a strong alkaline anion-exchange resin which is commercially available, for example, SNA-1 (trademark for product produced by Mitsubishi Kasei Corporation) having the following repeating units.

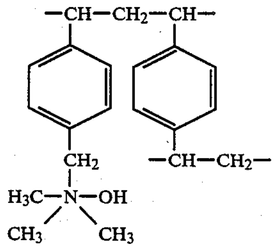

The cation-exchange resin used together with the above described anion-exchange resin used in the present invention preferably includes a strong acidic cation-exchange resin which is commercially available, for example, SKN-1 (trademark for product produced by Mitsubishi Kasei Corporation) having the following repeating units.

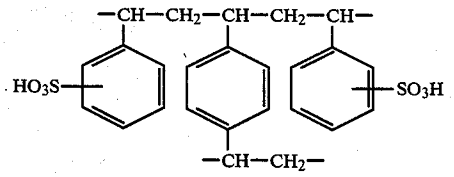

The method of the present invention may be implemented with a continuous or batch reactor for effecting oxidative decomposition of the resin feed.

Figure 1:
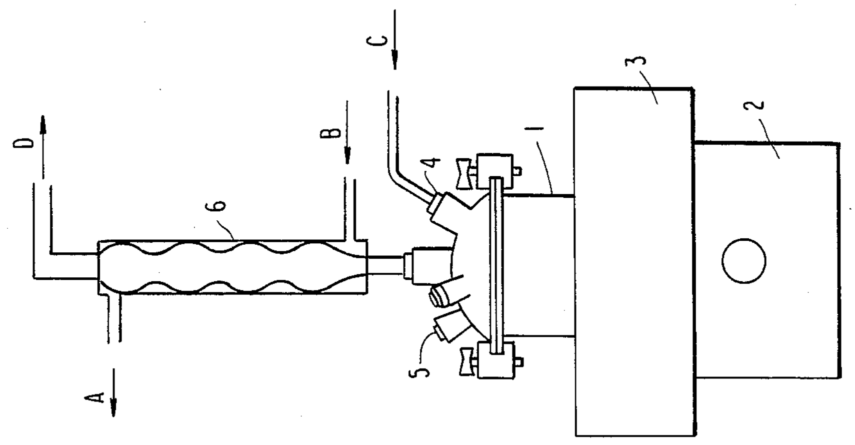
FIG. 1 is a schematic drawing of a continuous reactor that may be employed in oxidatively decomposing a waste ion-exchange resin by a method in accordance with one embodiment of the present invention.

FIG. 1 is a schematic drawing of a continuous reactor. A reaction vessel indicated by 1 is charged with an aqueous solution of the necessary catalysts and a waste ion-exchange resin. The charged reaction solution is stirred with a magnetic stirrer 2. The temperature of the reaction system is held constant by means of a water bath 3. A constant flow of an aqueous solution of hydrogen peroxide is fed into the reaction vessel through an inlet 4. The concentrations of the catalysts are held substantially constant by supplying a concentrated catalyst solution through an inlet 5. The catalyst concentrations may be set by any suitable method; they may be held substantially constant throughout the reaction; alternatively, the concentrations may be set in the initial period and left uncontrolled for the rest of the reaction period. Satisfactory treatments are possible if the concentrations of catalysts in the reaction solution before and after the reaction are kept within the ranges specified herein.

The waste ion-exchange resin may be fed in a continuous manner. Decomposition can be accomplished if the reaction temperature is within the range of from ambient temperatures to 100° C. and temperatures of at least 90° C. are preferably employed in order to attain a higher percentage of decomposition. The reaction vessel is preferably equipped with a stirrer.

The theoretical background for the accomplishment of the present invention is described hereinafter.

FIG. 2 is a graph showing the relationship between the $H_2O_2$/resin ratio, sludge weight, and percent decomposition. The $H_2O_2$/resin ratio means the amount of hydrogen peroxide (in grams for 100% $H_2O_2$) consumed for decomposing one gram on a dry weight basis of the ion-exchange resin.

Before the present invention, the technology of oxidative decomposition of waste ion-exchange resins has been discussed assuming $H_2O_2$/resin ratios of about 20 [see, for example, the working examples given in the specification of Japanese Patent Application (OPI) No. 44700/84]. If the matrix of a waste ion-exchange resin to be treated is polystyrene, a $H_2O_2$/resin ratio of approximately 6.5 is sufficient to achieve 100% decomposition of polystyrene and the $H_2O_2$ supplied is more than necessary if higher $H_2O_2$/resin ratios are employed.

As shown in FIG. 2, sludge formation is negligible if the $H_2O_2$/resin ratio is about 20, but an increasing amount of sludge will form if the ratio becomes 17 or lower by reducing the amount of $H_2O_2$ used. As already mentioned, discussion of the prior art technology for oxidative decomposition of waste ion-exchange resins has been made on the basis of $H_2O_2$/resin ratios of about 20 or more, and no attention has been paid to the formation of organic sludge. The present inventors noted the occurrence of sludge formation and unravelled the process of its formation and the factors that were involved as a result of conducting intensive studies in this aspect. The present invention has been accomplished on the basis of these findings.

Figure 3:
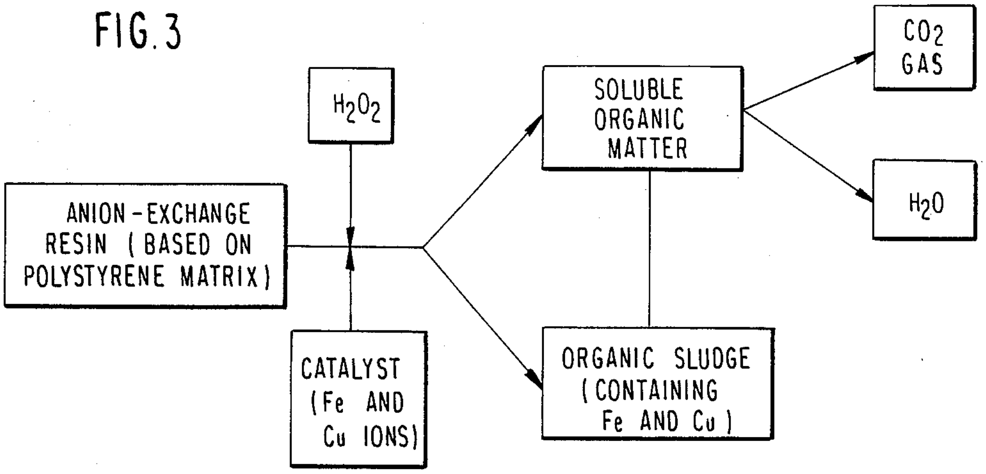
FIG. 3 shows the concept of the process of decomposition of an anion-exchange resin.

FIG. 3 shows the concept of the process of decomposition of an anion-exchange resin. In the process of its decomposition, an anion-exchange resin is converted to soluble organic matter and insoluble organic matter (i.e., sludge which actually is a mixture of organic matter, iron, and copper), and the soluble organic matter is eventually decomposed into water and $CO_2$ gas. Under $H_2O_2$-rich conditions $H_2O_2$/resin ratio $\geqq 20$), the organic sludge is completely decomposed to leave no residues, but if the $H_2O_2$/resin ratio is 17 or below, part of the organic sludge is left as residue. As already shown, if the ion-exchange resin is assumed to be solely made of polystyrene, the hydrogen peroxide supplied is excessive even if the $H_2O_2$/resin ratio is 10, and yet sludge formation is inevitable. Therefore, if one wants to perform oxidative decomposition of waste resins at low $H_2O_2$/resin ratios, it is important to achieve efficient treatment by minimizing the occurrence of sludge formation.

Another important factor that determines the efficiency of oxidative decomposition of waste resins is the pH of the reaction solution, or the reaction system of oxidative decomposition, and the efficiency of decomposition is highly dependent on pH if the treatment is conducted under the condition of low $H_2O_2$/resin ratios.

In order to verify this observation, the present inventors carried out experiments the conditions and results of which are summarized in the following Tables 1 to 5. As shown in Tables 1 and 2, the purpose was to study the effects of three factors (pH, concentration of iron catalyst, and concentration of copper catalyst) at two levels each, so the number of experiments that had to be run was eight ($2^7=L_8$). An experimental design was employed to make qualitative evaluation of the results and to analyze possible interactions between factors. Analysis showed that the main effects were the sole significant effects. The results and conditions of the experiments are summarized in Table 2, in which "decomposition (%)" is defined as follows:

$$\text{decomposition (\%)} = \frac{M_0 - M_1 - M_2}{M_0} \times 100$$

wherein $M_0$: carbon content (mg) of waste resin feed $M_1$: carbon content (mg) of reaction solution $M_2$: carbon content (mg) of sludge Analysis of variance (ANOVA) was carried out to investigate the contribution of separate sources of variance to the efficiency of decomposition and the results are summarized in Table 3, in which "contribution (%)" signifies the level of contribution of a specific source to the total variance of an experiment. The higher its level of contribution, the more significant a specific source of variance is.

TABLE 1

Experimental method and conditions

| | | | |
|---|---|---|---|
| Method | $L_8$ ($2^7$) experiment design | | |
| Characteristic values | decomposition (%) and the amount of sludge formed (its weight and volume) | | |
| Factors and levels | factor | level (two-level) | |
| | pH | 5 | 2 |
| | iron catalyst concentration (M) | 0.005 | 0.02 |
| | copper catalyst concentration (M) | 0.005 | 0.02 |
| Conditions | waste resin feed: anion-exchange resin, 4 g (dry weight) | | |
| | $H_2O_2$/resin ratio: 10 | | |
| | reaction temperature: 95° C. | | |

TABLE 2

Experimental Results

| Run No. | pH | Fe Concentration (M) | Cu Concentration (M) | Results: Decomposition (%) | Results: Sludge volume ($cm^3$) | Results: Sludge weight (mg) |
|---|---|---|---|---|---|---|
| 1 | 5 | 0.005 | 0.005 | 91.3 | 0.4 | 185 |
| 2 | 5 | 0.005 | 0.02 | 90.4 | 0.5 | 503 |
| 3 | 5. | 0.02 | 0.005 | 90.4 | 0.9 | 447 |
| 4 | 5 | 0.02 | 0.02 | 90.5 | 1.3 | 829 |
| 5 | 2 | 0.005 | 0.005 | 98.1 | 0.4 | 59 |
| 6 | 2 | 0.005 | 0.02 | 98.1 | 0.6 | 112 |
| 7 | 2 | 0.02 | 0.005 | 96.4 | 0.9 | 219 |
| 8 | 2 | 0.02 | 0.02 | 96.3 | 1.0 | 204 |

TABLE 3

ANOVA for percent decomposition

| Source of variance | Sum square of standard deviations | df | Variance | F Value | Contribution (%) |
|---|---|---|---|---|---|
| pH | 86.46 | 1 | 86.46 | 282.32* | 95.63 |
| Fe | 2.31 | 1 | 2.31 | 7.55 | 2.23 |
| Cu | 0.10 | 1 | 0.10 | 0.33 | 0 |
| error | 1.22 | 4 | 0.31 | — | 2.15 |

*The efficiency of decomposition (significant at the 0.05 level) is valid.

The results in Table 3 show that pH has the greatest effect on the efficiency of decomposition (significant at the 0.05 level) while the effects of iron and copper catalysts are negligible in this range.

The ANOVA was also carried out in order to investigate the effects of pH and Fe and Cu catalyst concentrations on each of the sludge volume and weight, and the results are summarized in Tables 4 and 5, respectively.

TABLE 4

ANOVA for sludge volume

| Source of variance | Sum square of standard deviations | df | Variance | F Value | Contribution (%) |
|---|---|---|---|---|---|
| pH** | — | — | — | — | — |
| Fe | 0.62 | 1 | 0.62 | 41.54* | 74.65 |
| Cu | 0.12 | 1 | 0.12 | 7.77 | 12.46 |
| error | 0.07 | 5 | 0.01 | — | 12.89 |

*The same meaning as in Table 3.
**The effect of pH was not significant and was small enough to justify its inclusion within the term of "error".

TABLE 5

ANOVA for sludge weight

| Source of variance | Sum square of standard deviations | df | Variance | F Value | Contribution (%) |
|---|---|---|---|---|---|
| pH | 235058.00 | 1 | 235058.00 | 13.22* | 47.00 |
| Fe | 87927.20 | 1 | 87927.20 | 4.94 | 15.17 |
| Cu | 68209.70 | 1 | 68209.70 | 3.84 | 10.91 |
| error | 71133.80 | 4 | 17783.50 | — | 26.93 |

*The same meaning as in Table 3.

As is clear from Table 4, the concentration of iron and copper catalysts have statistically significant effects on the volume of sludge formed during oxidative decomposition of waste resins and the iron catalyst concentration is more effective than the copper catalyst concentration by a factor of about 6 (see the "contribution (%)" column).

Table 5 shows that pH has a significant effect on the weight of sludge formed. This difference in the results of analyses for sludge formation between a weight basis and a volume basis may be explained as follows. Because of the solubility problem discussed below, the transfer of the iron and copper catalysts into sludge is highly dependent on the pH of the reaction solution and more rapid transfer occurs in the neighborhood of neutrality. Therefore, in terms of weight basis, both catalysts, which are fairly heavy (i.e., Fe and Cu are both heavy metals) would exhibit significant effects when they are present in the sludge.

Figure 4:
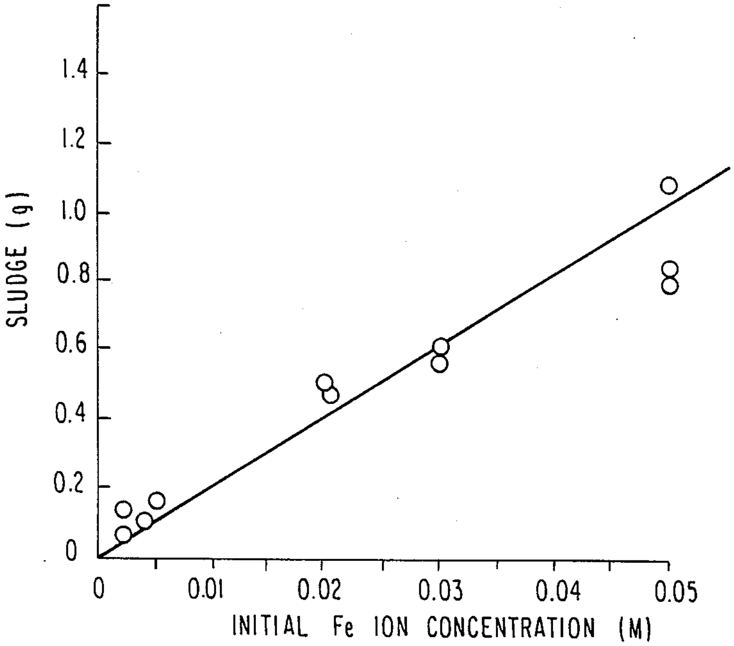
FIG. 4 shows the relationship between iron catalyst concentration and sludge formation.

In the light of the results described above, the present inventors noted that in order for a waste anion-exchange resin to be efficiently decomposed under the condition of low $H_2O_2$/resin ratios, the concentration of an iron catalyst would be an important factor from the viewpoints of both pH and sludge formation. As a result of extensive studies conducted to ascertain this observation, the present inventors have found that the iron catalyst concentration is closely related to the amount of sludge formation. A chemical analysis revealed that the sludge formed during oxidative decomposition of the waste resin is a mixture of organic matter, iron, and copper. FIG. 4 shows an example of the relationship between the iron catalyst concentration and sludge formation. In FIG. 4, the catalyst concentration is plotted as an initial concentration. As the reaction proceeds, the catalyst is transferred into the sludge and its concentration in the reaction solution is decreased, but this does not cause any significant problem for the treatment if the catalyst concentrations before and after the reaction are within the ranges specified by the present invention. These observations lead the present inventors to conclude that it is important to reduce the concentration of the iron catalyst while ensuring a high efficiency of the oxidative decomposition of waste resins.

This conclusion, however, is not in agreement with established chemical theories. It has been generally thought that the catalytic action of iron and copper for hydrogen peroxide is based on the cycle of iron ions as illustrated in the following schemes wherein R is an alkyl group:

| | | |
|---|---|---|
| $Fe^{2+} + H_2O_2 \longrightarrow Fe^{3+} + OH^- + .OH$ | (1) | (radical forming reaction) |
| $.OH + RH \longrightarrow H_2O + R.$ | (2) | (chain propagation reaction) |
| $R. + Fe^{3+} \longrightarrow R^+ + Fe^{2+}$ | (3) | |
| $Fe^{3+} + H_2O_2 \longrightarrow Fe^{2+} + HO_2 + H^+$ | (4) | |
| $R. + Cu^{2+} \longrightarrow R^+ + Cu^+$ | (5) | |
| $Cu^+ + Fe^{3+} \longrightarrow Cu^{2+} + Fe^{2+}$ | (6) | |
| $Fe^{2+} + .OH \longrightarrow Fe^{3+} + OH^-$ | (7) | (chain termination) |

As equation (1) shows, Fe is oxidized with $H_2O_2$ to $Fe^{3+}$, producing .OH. The radical .OH is a strong oxidizing agent and serves as a prime mover for the oxidative decomposition to be carried out in the present invention. If $Fe^{3+}$ions are used as an iron catalyst, they are reduced to $Fe^{2+}$(Eq. (4)) which then oxidizes to produce the OH radical (Eq. (1)). Therefore, the ion catalyst used may be in the form of either $Fe^{2+}$or $Fe^{3+}$ions The .OH radical produced as a result of Eq. (1) extracts hydrogen from an organic matter (Eq. (2)) to effect continued oxidation.

The functions of copper ions is apparent from Eqs. (5) and (6); they react with radicals in the organic matter to form $Cu^+$ , which converts $Fe^{3+}$ to $Fe^{2+}$ and thereby accelerates the radical forming reaction of Eq. (1) to attain an increased efficiency of oxidation.

When this theory is applied to an anion-exchange resin, the situation becomes rather complicated. It has been generally thought that the organic matter resulting from the decomposition of an anion-exchange resin has two properties which may tentatively be designated as $R_1$ and $R_2$. As in the case explained in the preceding paragraph, $R_1$ and $R_2$ produce $R_1$ and $R_2$, respectively, by way of Eqs. (1) and (2) but they undergo different reactions at a subsequent stage as follows:

$$R_1. + R_1. \rightarrow 2R_1 \qquad (8)$$

$$R_2. + Fe^{3+} \rightarrow R_2^+ + Fe^{2+} \qquad (3')$$

In other words, the organic matter produced as a result of decomposition of an anion-exchange resin is classified as being of two types, the first being that $R_1$ type which undergoes reaction between radicals to cause their wastage as suggested by Eq. (8) and the second being the $R_2$ type which takes due part in the chain propagation reaction. It is generally understood that anion-exchange resins cannot be efficiently decomposed solely by the use of iron ions, because the decomposition product of the $R_1$ type retards the intended chain reaction.

A plausible reason for the increase in the efficiency of decomposition resulting from the addition of a copper catalyst may be explained as follows. Even if the decomposition product is of the $R_1$ type, it reacts with copper as shown by the following scheme $$R_1. + Cu^{2+} \rightarrow R_1^+ + Cu^+ \qquad (5')$$

and can be integrated in the process of chain propagation.

As will be understood from the foregoing discussion, iron ions play a key role when organic matter is decomposed with $H_2O_2$ in the presence of iron and copper catalysts. The concept of achieving efficient decomposition of a waste anion-exchange resin at fairly low concentrations of iron ions while allowing organic sludge to form in small amounts would never have been attained if it had not been for the sludge problem.

Figure 5:
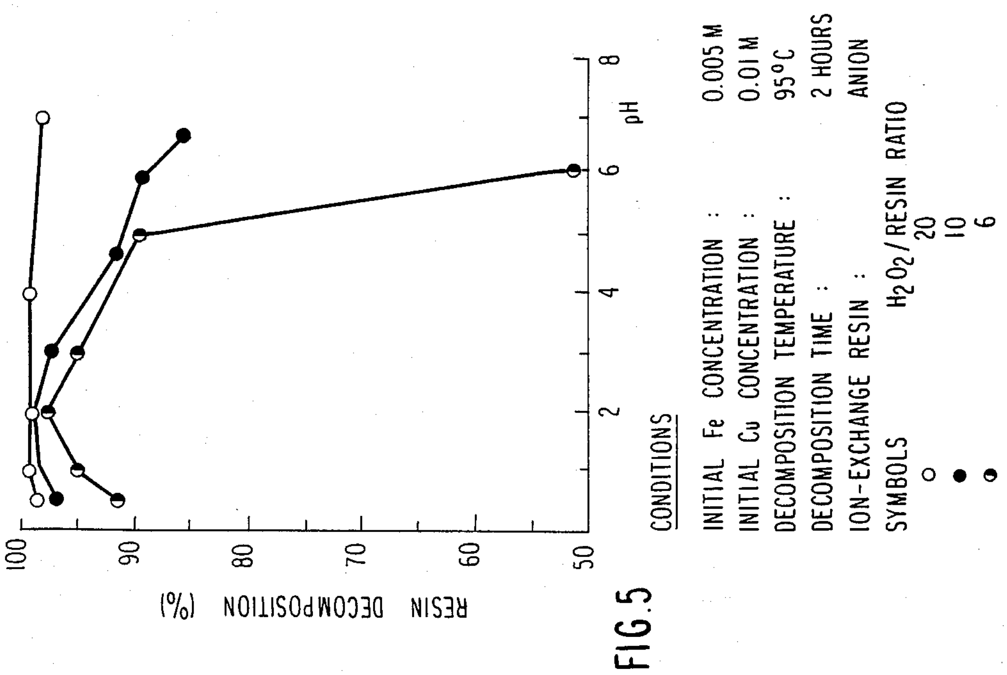
FIG. 5 is a graph showing the relationship between the pH and the percent decomposition of an anion-exchange resin.

No less important than the role of iron ions is the fact that, as already mentioned, the pH of the reaction system causes substantial effects when the $H_2O_2$/resin ratio is at low levels. It has been generally thought that an optimal pH range for an iron catalyst used in decomposition with $H_2O_2$ is from 2 to 3, and that a catalyst made of a mixture of iron and copper is active even in the neighborhood of neutrality, which is one of the advantages of the mixed catalyst. However, this holds true only when decomposition is effected in a $H_2O_2$ -rich atmosphere ($H_2O_2$/resin ratio$\geqq$20) and the present inventors have confirmed that even the mixed catalyst of iron and copper experiences an appreciable drop in its activity if the $H_2O_2$/resin ratio is 17 or below as is specified according to the present invention. Data showing this fact is presented in FIG. 5, from which one can see that the mixed catalyst which has heretofore been considered to have activity even in the neighborhood of neutrality becomes rather inactive if the $H_2O_2$/resin ratio is decreased, and that the percent decomposition of a waste anion-exchange resin becomes highly dependent on pH. As a result, under the condition of low $H_2O_2$/resin ratios, the efficiency of decomposition drops below 90% in the neighborhood of neutrality, and one of the advantages of the present invention is lost. Therefore, if a mixture of iron and copper is used as an oxidation catalyst, the pH of the reaction system is preferably within the range of from 0.5 to 6, and optimum results are attained within the range of from 1 to 5.

As mentioned above, even if the mixed catalyst of iron and copper is used, it becomes inactive if the $H_2O_2$/resin ratio is low, and a plausible reason for this phenomenon may be explained as follows. The reaction occurring in the method of the present invention is based on iron ions. As Eq. (1) shows, the OH radical (.OH) which forms when $Fe^{2+}$ is changed to $Fe^{3+}$ is the prime mover of oxidative decomposition. The water solubility of $Fe^{3+}$ is very low. The iron in organic sludge is in the form of Fe (III), and, taking ferric hydroxide as an example, its solubility product (Ksp) is $7.1\times10^{-40}$ at 25° C. According to simple computation, the amount of ferric hydroxide dissolved in water is 0.79 M at a pH of 1, $7.9\times10^{-4}$ M at pH 2, and $7.9\times10^{-7}$ M at pH 3; and this indicates that ferric hydroxide is hardly soluble in water except at very low pH values.

Ferric ($Fe^{3+}$) ions will work effectively in the oxidation cycle represented by Eqs. (1) thru (7) only when they are reduced to $Fe^{2+}$ ions by way of Eqs. (3), (4) and (6), or when they form a soluble organic complex, and one may safely conclude that they will be precipitated in all other cases if the pH is 2 or more. In fact, however, the reactions expressed by Eqs. (3), (4) and (6) are believed to fail to proceed satisfactorily if the $H_2O_2$/resin ratio is 17 or below and the pH is near neutrality. In other words, a progressively increasing amount of Fe is accumulated in the sludge and the amount of Fe available in the reaction solution decreases to cause inactivation of the catalyst.

Figure 6:
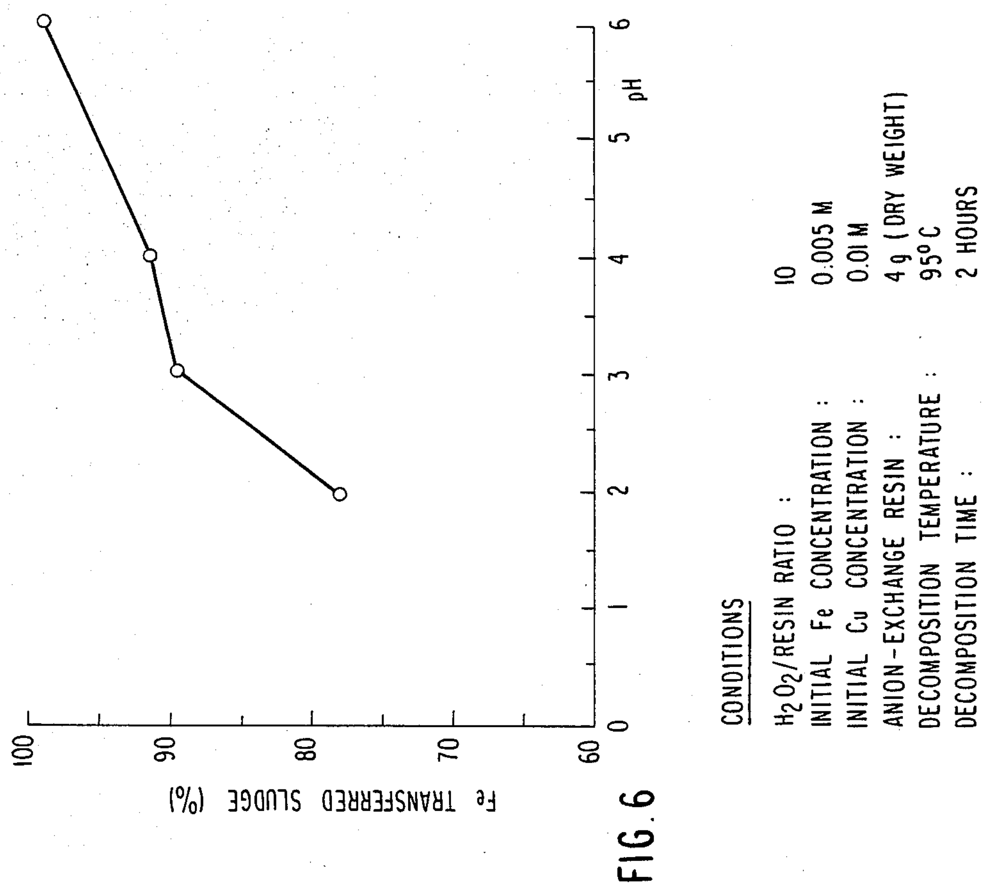
FIG. 6 is a graph showing the relationship between pH and the percent transfer of Fe ions into sludge.

FIG. 6 shows the percent transfer of Fe ions from the catalyst into the sludge. The percent transfer of catalyst into sludge is defined as follows.

$$\text{Transfer to sludge (\%)} = \frac{\text{amount of catalyst in sludge (mol)}}{\text{initial amount of catalyst (mol)}} \times 100$$

As FIG. 6 shows, the percent transfer of Fe ions into sludge increases with increasing pH. The rate of increase in percent transfer of Fe ions into sludge may safely be regarded as a measure of the insufficiency of Fe ions in the reaction solution and the resulting inactivation of the catalyst. The other factor that cannot be ignored in this respect is that $Cu^{2+}$ is precipitated as $Cu(OH)_2$ if the pH is 5 or above.

The implications of the data shown in FIG. 6 are that the amount of sludge on a weight basis increases with increasing pH, and that an anion-exchange resin should advantageously be treated in the acidic pH range not only from the viewpoint of efficient decomposition, but also for the purpose of reducing sludge formation.

Even if the treatment is conducted in the acidic range, the catalyst ions are transferred into the sludge and their concentrations in the reaction solution will be decreased. However, satisfactory results are attained in the decomposition of waste resins if the catalyst concentrations before and after oxidative decomposition are within the ranges specified by the present invention. Whether this requirement is met can be readily checked by performing a single run of experiment and determining the percent transfer of catalyst ions onto the sludge formed as a result of the experiment.

Figure 7:
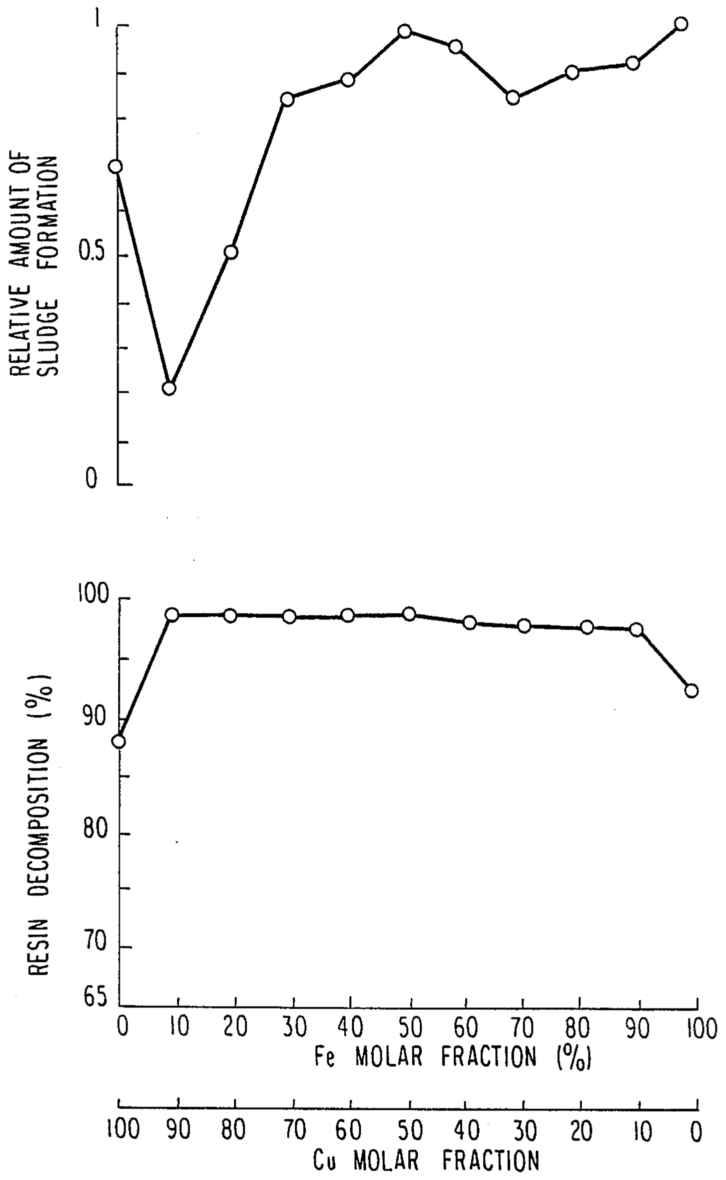
FIG. 7 is graph showing the relationship between the molar fractions of Fe and Cu catalyst concentrations as related to each of the percent decomposition of resin and the relative amount of sludge formation.

Based on the foregoing findings, the present inventors examined the relationship between the catalyst concentration (Fe or Cu) and each of the percent resin decomposition and the relative amount of sludge formation when the pH was within the range of 2 to 3, and the results are shown in FIG. 7. The experiment was carried out by varying the molar ratios of Fe and Cu ion concentrations over the range of from 0 to 0.03M, respectively, such that the sum of initial Fe and Cu ion concentrations would be 0.03 M. The "relative amount of sludge formation" denotes the amount of sludge formed, with the value attained by treatment in the presence of 0.03 M of Fe ions alone being taken as one (on a dry weight basis).

In the pH range of 2 to 3, the activity of iron catalyst itself is high so that the effectiveness of the mixed solvent of iron and copper is not greatly influenced by the changes in the molar fractions of Fe and Cu ions. Therefore, as FIG. 7 shows, the mixed catalyst attained high percentages of decomposition (from about 97 to 99%) and was superior to the catalyst made solely of copper (about 88%) or iron (about 92%). FIG. 7 also shows that the amount of sludge formation dropped markedly when the molar fraction of Fe ions was low.

Figure 8:
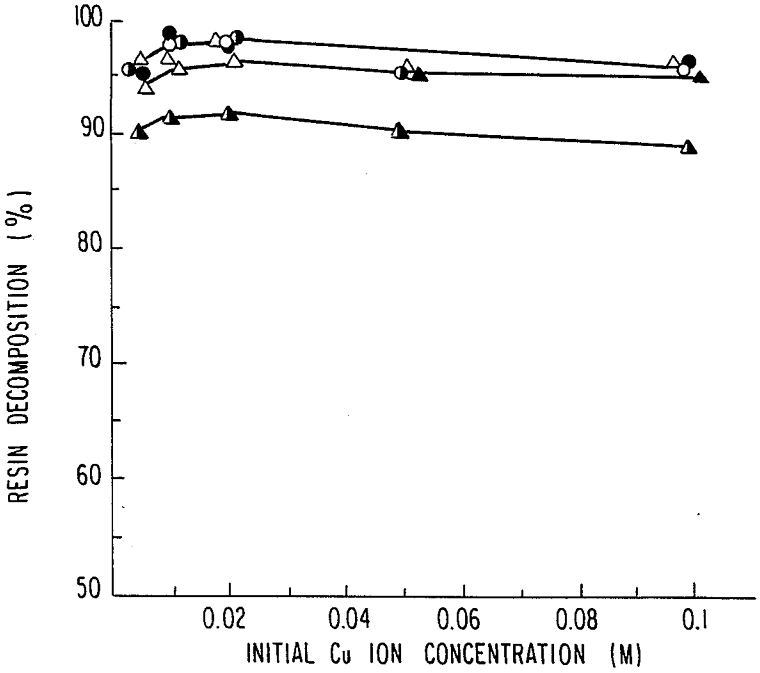
FIG. 8 is a graph showing the effect of Cu catalyst concentration on the percent decomposition of resin, with the Fe ion concentration being taken as a parameter.

The present inventors conducted a closer study of the effect of Cu concentration on the efficiency of resin decomposition, and the results are shown in FIG. 8, from which one can see that when the Cu concentration was within the range of from 0.005 M to 0.1 M, a substantially constant efficiency of decomposition was attained irrespective of the Fe concentration. Further study was conducted in order to identify the lower and higher limits of the Cu concentrations and it was found that satisfactory decomposition could be attained over a fairly wide range of Cu concentrations, with 0.002 M being a minimum value and 0.15 M a maximum value. This breadth of the effective range of Cu concentrations is another indication of the fact that the iron catalyst plays a key role in the oxidative decomposition performed by the method of the present invention.

Figure 9:
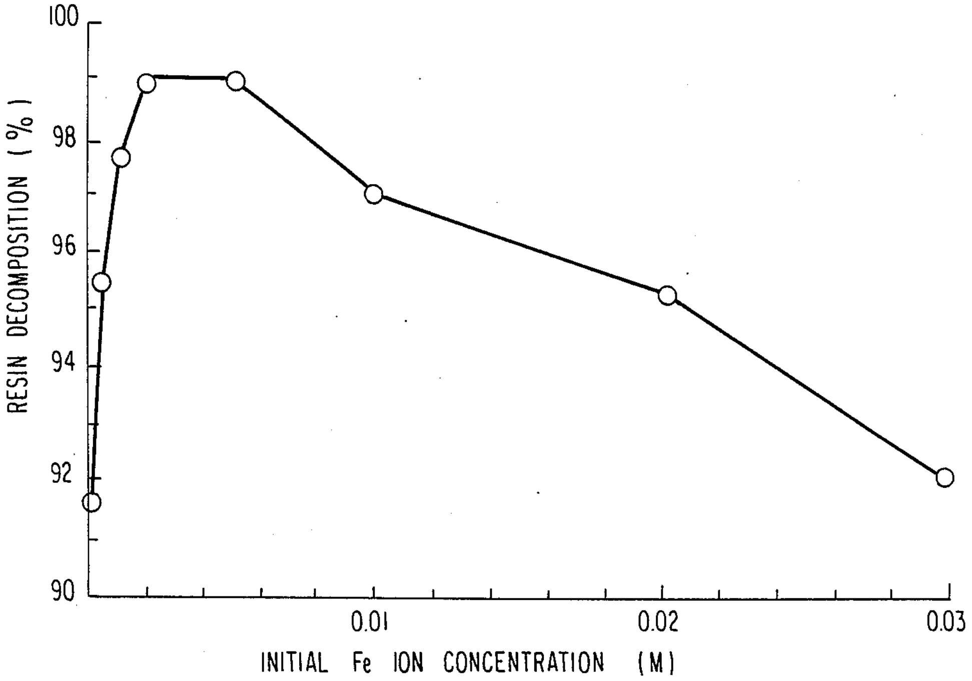
FIG. 9 is a graph showing the relationship between the concentration of an iron catalyst and the percent decomposition of resin.

In order to clarify the effect of Fe concentration on the efficiency of decomposition, the present inventors conducted an experiment in which the Fe concentration was varied with the Cu concentration being fixed at 0.01 M, which, according to FIG. 8, attained satisfactory decomposition. The results are shown in FIG. 9, from which one can see that at least 0.0005 M of Fe ions is necessary in order to attain a satisfactory efficiency of decomposition. On the other hand, 0.02 M of Fe ions is the upper limit beyond which the amount of sludge formed will exceed 10% of the initial resin feed.

Therefore, if, in the treatment of an anion-exchange resin at a $H_2O_2$/resin ratio of no more than 17, the pH of the reaction solution is maintained within the range of from 0.5 to 6, and preferably from 1 to 5, while the concentrations of an iron and a copper catalyst are set within the ranges of from 0.0005 to 0.02 M (preferably 0.002 to 0.015 M) and 0.002 to 0.15 M (preferably 0.005 to 0.1 M), respectively, highly efficient decomposition of the resin can be achieved and yet the amount of sludge formation is reduced.

The method of the present invention is applicable not only to the purpose of decomposing anion-exchange resins which are heretofore considered refractory to the prior art decomposing techniques, but also to the purpose of decomposing mixtures of cation- and anion-exchange resins. In the latter case, the present invention is capable of efficient decomposition with minimum formation of sludge if the ratio of $H_2O_2$ to the total weight of cation- and anion-exchange resins on a dry basis is no more than 17.

As described in the foregoing pages, the present invention provides a method by which an anion-exchange resin or a mixture thereof with a cation-exchange resin can be oxidatively decomposed with hydrogen peroxide in the presence of iron and copper ions used as catalysts under the economical condition of a $H_2O_2$/resin ratio of 17 or below, and efficient decomposition can be achieved with sludge formation suppressed to a reduced level by keeping the pH of the reaction solution within the range of from 0.5 to 6, and preferably from 1 to 5, and, in addition, by setting the concentrations of the iron and copper catalysts to be preferably within the ranges of from 0.0005 to 0.02 M (more preferably from 0.002 to 0.015 M) and from 0.002 to 0.15 M (more preferably from 0.005 to 0.01 M), respectively.

In short, the present invention enables an anion-exchange resin to be decomposed with a smaller amount of hydrogen peroxide, and yet the efficiency of decomposition is higher than the heretofore attainable values.

Anion-exchange resins are known to have the following relationship between adsorbed ionic species and the efficiency of their decomposition.

$SO_4$ type>OH type>Cl type high→(decomposition)→low

The proportions of ionic species adsorbed on two typical waste ion-exchange resins are listed in Table 6, from which one can see that Amber IRA 400C as a typical anion-exchange resin (product of Rohmand Haas) contains 80% $OH^-$ and 20% $Cl^-$. The above-indicated relationship suggests that the $Cl^-$ content (20%) of this anion-exchange resin is detrimental to the purpose of decomposing it in an efficient manner. Therefore, one may reasonably expect that this resin could be decomposed with increased efficiency by adsorbing $SO_4^{2-}$ and other anions on it before it is subjected to decomposition.

TABLE 6

| Adsorbed ionic species in waste resins*** | | | | | |
|---|---|---|---|---|---|
| | Cation-exchange resin (Amberlite IR 120L) | | | Anion-exchange resin (Amber IRA 400C) | |
| Ion | Adsorbed Amount (eq/l) | % | Ion | Adsorbed Amount (eq/l) | % |
| $Cr^{2+}$ | $8.0 \times 10^{-2}$ | <1 | $Cl^-$ | $280 \times 10^{-3}$ | 20 |
| $Fe^{2+}$ | $4.6 \times 10^{-2}$ | 2 | $OH^-$ | $1120 \times 10^{-3}$ | 80 |
| $Co^{2+}$ | $2.0 \times 10^{-3}$ | <1 | | | |
| $Ni^{2+}$ | $320 \times 10^{-3}$ | 17 | | | |
| $Cu^{2+}$ | $1.0 \times 10^{-3}$ | <1 | | | |
| $Ag^+$ | $3.0 \times 10^{-3}$ | <1 | | | |
| $H^+$ | $1520 \times 10^{-3}$ | 80 | | | |
| Total | | 100 | | | 100 |

***Reproduced from Japanese Patent Publication No. 38920/81; the waste resins were extracted from a plant for purifying cooling water used in a nuclear reactor.

The selectivity for adsorption of ions by an anion-exchange resin decreases in the following order: citric acid ion $>SO_4^{2-}>I^->NO_3^->CrO_4^{2-}>Br^->SCN^->Cl^->F^-$. Therefore, the $SO_4^{2-}$ ion is more readily adsorbed than the $Cl^-$ ion and the citric acid ion is more easily adsorbed than any other ionic species. A $Cl^-$ form resin is less decomposable than other types of anion-exchange resins, and this is assumed to be because the $Cl^-$ ion is an inhibitor of the OH radical forming reaction. The present inventors have first discovered that citric acid type anion-exchange resins can be decomposed with high efficiency, and this discovery is based on their success in unravelling the peculiar mechanism behind the oxidative decomposition of anion-exchange resins.

Figure 10:
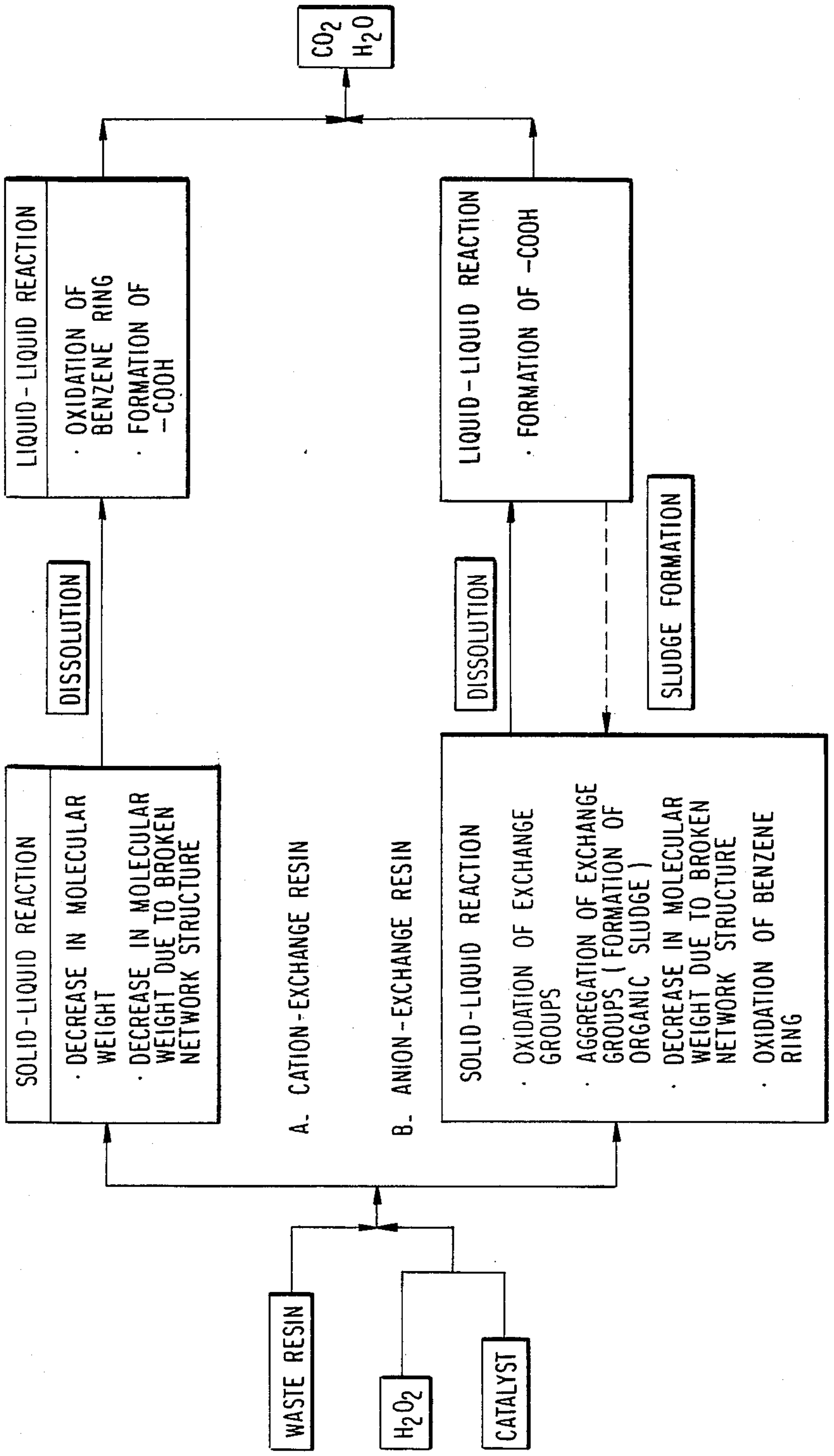
FIG. 10 is a diagram indicating the mechanisms by which waste ion-exchange resins are decomposed oxidatively.

As FIG. 10 shows, the process of decomposition of waste resins differs greatly between cation-exchange and anion-exchange resins. The cation-exchange resin which is comparatively easy to decompose undergoes a solid-liquid reaction (see FIG. 10) in which its structure is readily destroyed and dissolved in the reaction solution. This reaction proceeds very rapidly. In the subsequent liquid-liquid reaction, the resin is oxidatively decomposed to yield water and carbon dioxide as the final decomposition products. The behavior of the anion-exchange resin which is intended to be decomposed by the method of the present invention differs greatly from the cation-exchange resin. The major difference is that the anion-exchange resin will not be readily dissolved as a result of solid-liquid reaction. If the resin remains solid, the efficiency of its decomposition is low and this is one of the factors that render the anion-exchange resin highly refractory to the existing decomposition techniques. The mechanism by which the resin remains solid is identified in FIG. 10 under the heading "sludge formation", which is discussed hereinafter in detail.

An anion-exchange resin removes radioactive ions from water in accordance with the following reaction:

$$R\text{-}N^+OH^- + Rad^- \rightleftharpoons R\text{-}N^+Rad^- + OH^-$$

wherein

R represents the matrix (polystyrene) of ion-exchange resin, $Rad^-$ represents radioactive ion, and N represents nitrogen.

Since $R\text{-}N^+$ does not have very high affinity for $OH^-$, it readily dissociates from $OH^-$ and combines with any other anion that is available.

As shown in Table 6, most of the waste resins extracted from plants for purifying nuclear reactor cooling water are of the $OH^-$ type. In the process of oxidative decomposition, the resin undergoes dissolution in the reaction solution and produces COOH. By the term "dissolution" is usually meant that the resin is disintegrated into fine particles of a size of no larger than 0.45 μm. In this case, the particles are believed to be composed of C and H, and may be expressed as $P-COO^-H^+$ (where P signifies the matrix of the fine particles). During reaction, both solid matters and soluble components exist in the solution and $R-N^+OH^-$ reacts with $P-COO^-H^+$ to form $R-N^+-COO-P$ which adheres to the active sites of the residual $R-N^+OH^-$ in succession until the resin undergoes re-solidification to form sludge.

Based on this assumption, the present inventors reasoned as follows: since the product of oxidative decomposition of an anion-exchange resin is anionic, sludge formation could be prevented by inactivating the ion-exchange capacity of the resin and this may be achieved by attaching ionic species that have strong affinity for the anion-exchange resin. As already noted, the selectivity for adsorption of ions by an anion-exchange resin decreased in the order of: citric acid ion $>SO_4^{2-}>I^{31}>NO_3^->CrO_4^{2-}>Br^->SCN^->Cl^->F^-$. Apparently, citric acid is more readily adsorbed than any other of the ionic species listed above. The structure of sodium citrate is expressed by

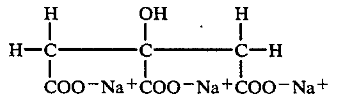

and its adsorption takes places at the sites of —$COO^-$. Therefore, if citric acid is preliminarily adsorbed on the anion-exchange resin to be decomposed, the intended reaction can be effected in an efficient manner without allowing any substantial amount of sludge to form.

Figure 11:
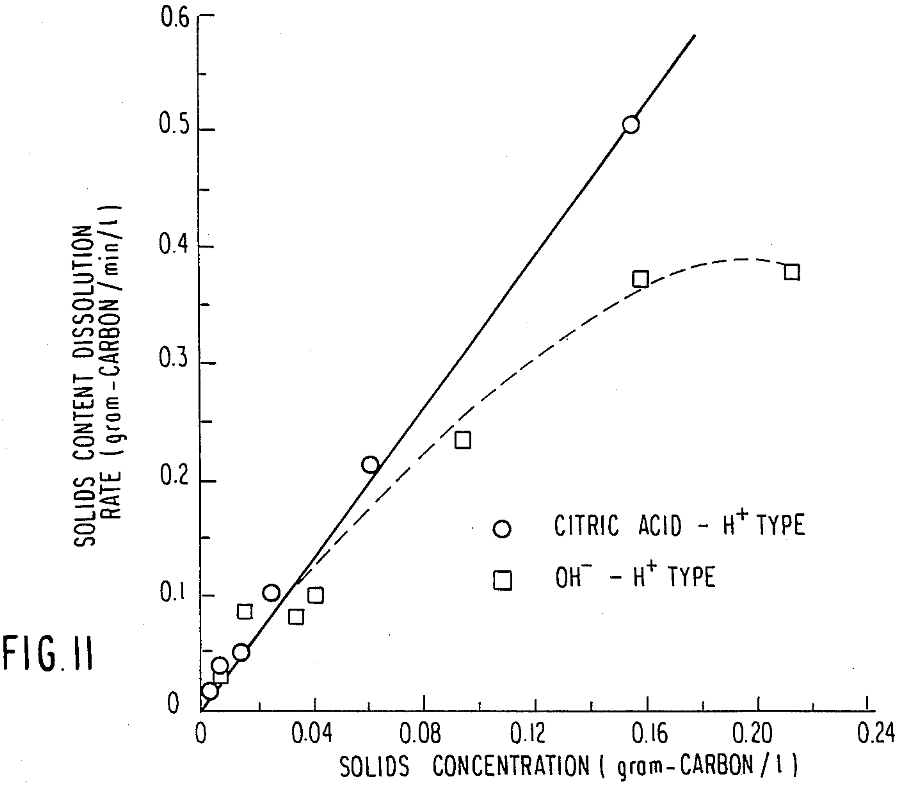
FIG. 11 is a graph showing the effect of citric acid ions on the dissolution of solid matter as related to the solids content.

The effect of citric acid ions on the dissolution of solid matter is shown in FIG. 11. Clearly, an anion-exchange resin that was converted to the citric acid form exhibited a substantially linear relationship between the solids concentration in terms of carbon content and the rate of their dissolution. On the other hand, a non-citric acid type anion-exchange resin displayed reduced dissolution rates in the high solids-content region because of the occurrence of sludge formation. The effectiveness of the citric acid type anion-exchange resin is therefore clear.

By utilizing the difference in adsorbability between $SO_4^{2-}$ and $Cl^-$ ions and its relationship to the percent decomposition of an anion-exchange resin to which these anions had been adsorbed and a mixture thereof with a cation-exchange resin, citric acid ions were adsorbed on an anion-exchange resin which was then subjected to oxidative decomposition treatment. In the experiment, two types of resins were used, one being a mixture of $OH^-$ and $H^+$ form resins, and the other being a mixture of citric acid and $H^+$ form resins. It should also be mentioned that $OH^-$ and $Cl^-$ form anion-exchange resins can be readily converted to the citric acid type by adsorbing citric acid or a salt thereof through routine regeneration techniques. In performing oxidative decomposition on these resins, the $H_2O_2$/resin ratio and the period of treatment should be carefully determined. In consideration of the relationship between the $H_2O_2$ feed (g) and the ion-exchange resin to be treated, the $H_2O_2$/resin ratio is preferably set to a value of no higher than 10 and the treatment is preferably completed within a period of 60 minutes.

Figure 12:
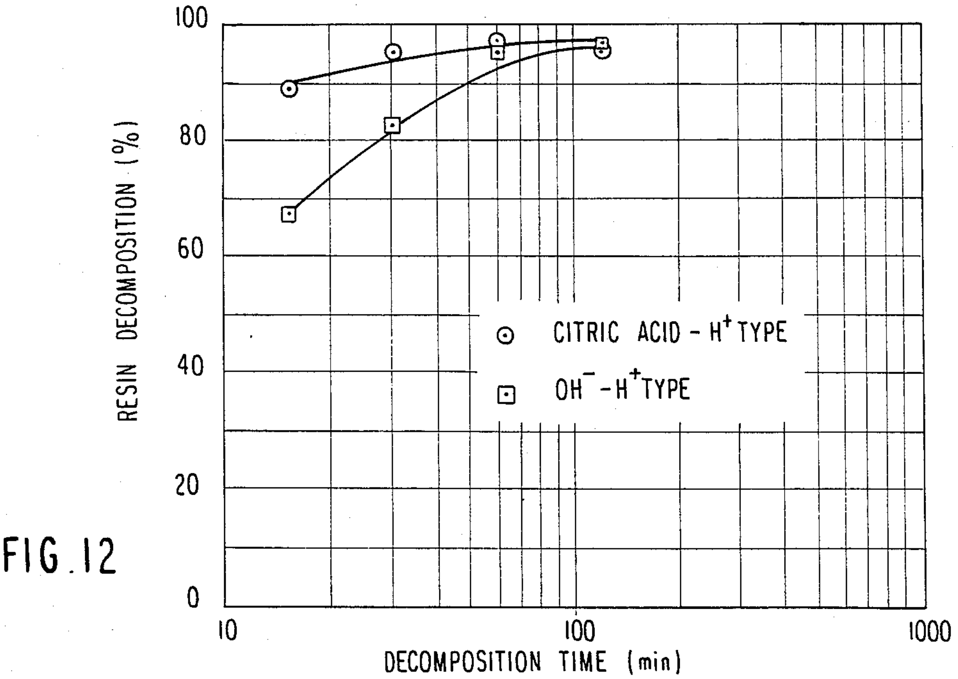
FIG. 12 is a graph showing the relationship of the percent decomposition of $OH^-$—$H^+$ type mixed resin and citric acid —$H^+$ type mixed resin vs the period of treatment of each of the resins.

The results of the experiment described above are shown in the following Tables 7 and 8 and in FIG. 12. Table 7 shows the percent decomposition of the mixed resin of $OH^-$ and $H^+$ types for varying reaction times of 120, 60, 30 and 15 minutes with the feed of hydrogen peroxide (g) held constant. Table 8 shows the results for the mixed resin of citric acid and $H^+$ types. FIG. 12 shows the relationship of percent decomposition vs the period of treatment of each of the mixed resins.

TABLE 7

Percent decomposition of $OH^-$—$H^+$ mixed resin for varying reaction times

| Resin type | $OH^-$—$H^+$ | | | |
|---|---|---|---|---|
| Anion-exchange resin (g) | 3 | | | |
| Cation-exchange resin (g) | 3 | | | |
| Distilled water (ml) | 100 | | | |
| Fe catalyst (M) | 0.005 | | | |
| Cu catalyst (M) | 0.01 | | | |
| Reaction temperature (°C.) | ca. 100 | | | |
| pH of reaction solution | ca. 2 | | | |
| 30% $H_2O_2$ (ml/min) | 1 | 2 | 4 | 8 |
| Reaction time (min) | 120 | 60 | 30 | 15 |
| Resin decomposition (%) | 95 | 94 | 82 | 67 |

TABLE 8

Percent decomposition of citric acid — $H^+$ mixed resin for varying reaction times

| Resin type | citric acid — $H^+$ | | | |
|---|---|---|---|---|
| Anion-exchange resin (g) | 3 | | | |
| Cation-exchange resin (g) | 3 | | | |
| Distilled water (ml) | 100 | | | |
| Fe catalyst (M) | 0.005 | | | |
| Cu catalyst (M) | 0.01 | | | |
| Reaction temperature (°C.) | ca. 100 | | | |
| pH of reaction solution | ca. 2 | | | |
| 30% $H_2O_2$ (ml/min) | 1 | 2 | 4 | 8 |
| Reaction time (min) | 120 | 60 | 30 | 15 |
| Resin decomposition (%) | 95 | 96 | 95 | 89 |

The above results show the following: when the reaction time was 60 minutes which was half the period required in the prior art, both types of mixed resin could be decomposed by about 95%; when the reaction time was further reduced to 30 minutes, the efficiency of decomposition of the $OH^-$—$H^+$ form resin was markedly decreased but the mixed resin of citric acid and $H^+$ types could still be decomposed by 95%.

As will be understood from the foregoing explanation, the present invention provides a method by which an anion-exchange resin or a mixture thereof with a cation-exchange resin is oxidatively decomposed with hydrogen peroxide in the presence of a combined catalyst of iron and copper. According to the invention, citric acid ions are preliminarily adsorbed on the anion-exchange resin before oxidative decomposition is effected, and by so doing, the resin can be decomposed at an economical $H_2O_2$/resin ratio of no higher than 10 and within a reaction time of no longer than half of the heretofore required period, and yet a satisfactorily high efficiency of decomposition can be attained.

The objects of the present invention can be attained by crushing a granular waste ion-exchange resin into finer particles before it is oxidatively decomposed with hydrogen peroxide in the presence of a mixed catalyst of iron and copper ions. The crushing of the waste ion-exchange resin serves to increase its specific surface area so that its reaction with the oxidizing agent ($H_2O_2$) in the subsequent step of oxidative decomposition can be carried out with an increased efficiency. As a result, the consumption of hydrogen peroxide can be decreased to a $H_2O_2$/resin ratio of 17 or below, or even to 10 or below, and yet a high efficiency of decomposition can be attained within a shorter period of reaction time.

In the crushing step, the waste ion-exchange resin is crushed into fine particles having an average diameter of preferably, 400 $\mu m$ or less, more preferably 200 $\mu m$ or less, and most preferably from 100 $\mu m$ to 5 $\mu m$.

Figure 13:
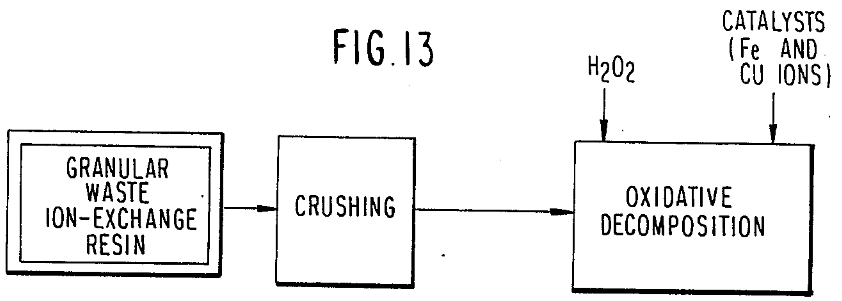
FIG. 13 is a flowsheet of a process for oxidatively decomposing a waste ion-exchange resin according to another embodiment of the present invention.

FIG. 13 is a flowsheet of this method of the present invention for oxidatively decomposing a waste ion-exchange resin. A granular waste resin is first fed into the crushing stage at which it is crushed into finer particles, which are then introduced into subsequent stage of oxidative decomposition, in which the crushed resin is subjected to oxidative decomposition with hydrogen peroxide in the presence of a mixed catalyst of iron and copper ions.

An electromagnetic crusher is advantageously used as a means for crushing the ion-exchange resin. As shown schematically in FIG. 14, this crusher has the following three components: a vessel 8 that is made of a corrosion-resistant non-magnetic material and which contains a number of spindle-shaped working media 7 that are formed of a ferromagnetic material; and two moving field generators 9 and 10 placed on top and bottom of the vessel 8. Moving field generators are well known as linear motors and each consists of an iron core equipped with a multi-phase AC winding that is disposed along the magnetic poles of the core. When current is supplied to the multi-phase AC windings, moving magnetic fields are induced in opposite directions as indicated by arrows $\alpha 1$ and $\alpha 2$. An electromagnetic force is then produced in the vessel 8 by the interaction between the working media 7 and the moving fields and as a result, the working media 7 in the vessel 8 are lifted and start to revolve about their center of gravity while moving around in the vessel 8 in either direction of the movement of the magnetic fields. When a granular waste ion-exchange resin is supplied into the vessel 8 at this stage, the resin is brought into violent contact with the working media 7 and is crushed into finer particles indicated by numeral 11*a* in FIG. 14.

Figure 15:
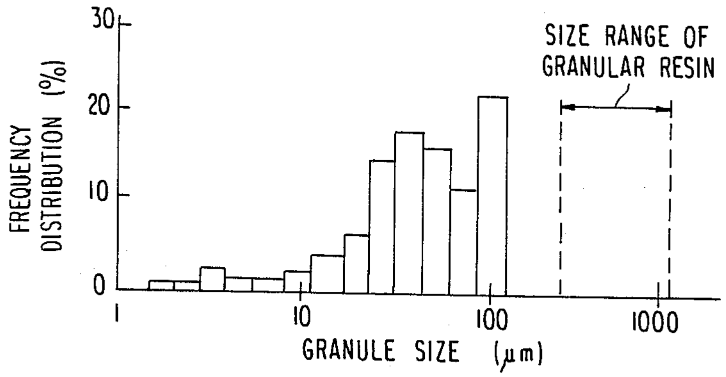
FIG. 15 shows the particle size distribution of a granular ion-exchange resin that was crushed into finer particles by the device shown in FIG. 14.

The power of the electromagnetic crushing method described above is very strong and the present inventors confirmed by experiment that this method was capable of crushing a granular ion-exchange resin into finer particles by a treatment of only few minutes. The results of the experiment are shown in FIG. 15. In the experiment, Diaion of Mitsubishi Chemical Industries, Limited was used as the resin sample to be treated; it consisted of particles ranging in size from 420 to 1,190 $\mu$m and was based on a polystyrene matrix. By performing the electromagnetic crushing method on this resin, it could be crushed into particles of a size of no larger than 200 $\mu$m (average size, 30 to 50 $\mu$m) within a few minutes.

An apparatus of the type shown in FIG. 1 is employed in the oxidative decomposition stage of the process shown in FIG. 13.

Crushing a granular ion-exchange resin into finer particles before it is decomposed oxidatively with the particles suspended in the reaction solution in the reaction vessel offers the following advantages: the specific surface area of the resin is appreciably increased and the chance of its contact with chemicals is sufficiently increased to permit efficient progress of subsequent oxidative decomposition. As a consequence, the $H_2O_2$/resin ratio, which is a measure of $H_2O_2$ consumption, and the decomposition period are significantly reduced.

Figure 14:
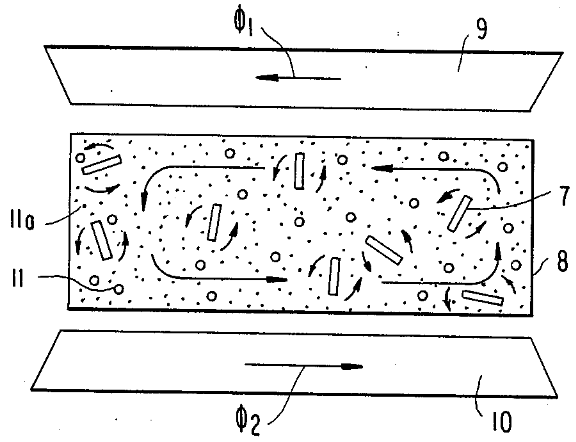
FIG. 14 shows the operating principle of an electromagnetic crusher that is employed in the crushing step of the process shown in FIG. 13.

Using the apparatus shown in FIGS. 1 and 14, the present inventors conducted an experiment on the oxidative decomposition of ion-exchange resins with a view to evaluating the effectiveness of the method based on the principle illustrated in FIG. 13. In the first step, a mixture of cation- and anion-exchange resins was finely divided with an electromagnetic crusher of the type shown in FIG. 14. Four grams of the resin particles were charged into the reaction vessel of the apparatus shown in FIG. 1 together with a mixed catalyst of iron and copper ions. After the reaction temperature had been adjusted to 95° C., 30% hydrogen peroxide was continuously fed into the reactor at a rate of 1 ml/min so as to effect oxidative decomposition of the resin. The efficiency of decomposition as related to the decomposition time and the $H_2O_2$/resin ratio was investigated. The same experiment and investigation were undertaken with an uncrushed granular ion-exchange resin being used as a specimen.

Figure 16:
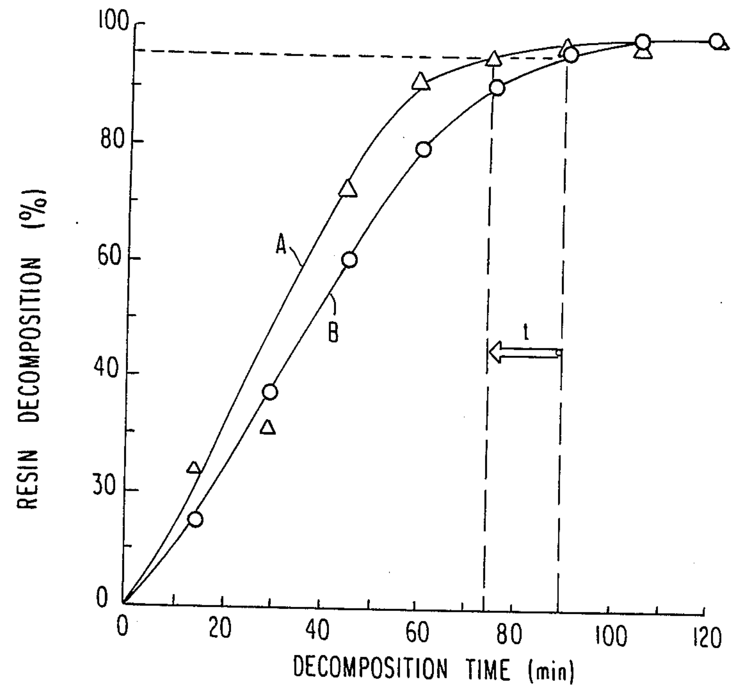
FIG. 16 is a characteristic graph showing the profile of percent decomposition vs decomposition time as obtained by the method using crushed ion-exchange resin and the method using uncrushed ion-exchange resin.

The profile of percent decomposition vs decomposition time as obtained by each method is shown in FIG. 16, wherein the characteristic curve A refers to the method using crushed ion-exchange resin and curve B refers to the method using uncrushed ion-exchange resin. As is clear from the characteristic graph of FIG. 16, when the decomposition period was 120 minutes during which hydrogen peroxide was supplied into the reactor for a $H_2O_2$/resin ratio of 9, the ion-exchange resin could be decomposed by at least 97% whether or not it had been crushed into finer particles. However, the behavior of the two specimens differed greatly when they were undergoing decomposition and the crushed ion-exchange resin (characteristic curve A) could be decomposed very rapidly as compared with the uncrushed resin (curve B). If the decomposition to be attained in 95%, the uncrushed granular resin took 90 minutes to be decomposed ($H_2O_2$/resin ratio of 6.75) as indicated by characteristic curve B whereas the crushed resin took only 75 minutes to be decomposed ($H_2O_2$/resin ratio of 5.67) as indicated by curve A. In other words, the method of the present invention achieved reductions of 15 minutes and 1.08 in time (t) and H ratio, respectively It is therefore clear that crushing a resin feed before it is subjected to oxidative decomposition is effective not only in improving the efficiency of its decomposition but also in reducing the consumption of hydrogen peroxide supplied during the shortened period The present inventors then recovered the unreacted ion-exchange resin from the reaction vessel and subjected it to another treatment under a $H_2O_2$-rich condition ($H_2O_2$/resin ratio=20) so that it could be completely decomposed. Based on the amount of hydrogen peroxide consumed in the overall treatment including the crushing step and subsequent step of oxidative decomposition, the present inventors calculated the final $H_2O_2$/resin ratio, or the sum of the amount in grams of $H_2O_2$ used in the first decomposition and the amount in grams of $H_2O_2$ used in the second decomposition as divided by the amount in grams of the resin feed. The final $H_2O_2$/resin ratio for the uncrushed granular resin was 8.1, but when the crushed resin was used this value was decreased to 5.8.

Figure 17:
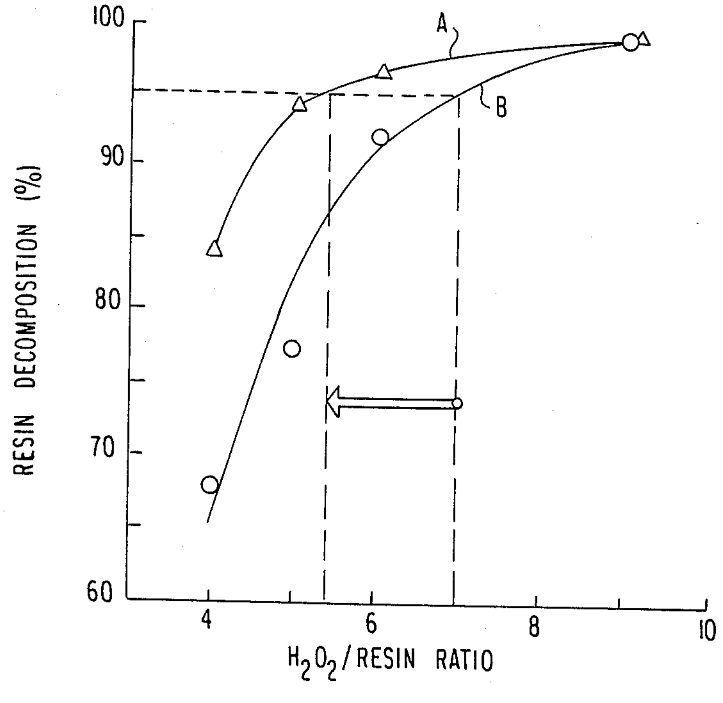
FIG. 17 is a characteristic graph showing the profile of percent decomposition vs $H_2O_2$/resin ratio as obtained by the method using crushed ion-exchange resin and the method using uncrushed ion-exchange resin.

The profile of the efficiency of decomposition vs $H_2O_2$/resin ratio is shown in FIG. 17. As is clear from characteristic curve B, the uncrushed granular ion-exchange resin could be decomposed by 95% when the $H_2O_2$/resin ratio was about 7, but when this ratio was decreased to 6 or below, the efficiency of decomposition dropped markedly. On the other hand, as curve A shows, the crushed resin could be decomposed by at least 94% for the H ratio range of down to about 5. In order to confirm the effectiveness of the method of the present invention in a more precise manner, the present inventors conducted the following experiment: resins were decomposed for a given period with the $H_2O_2$/resin ratio being varied from 4 to 9; then, the unreacted resin was recovered from the reaction vessel and subjected to another treatment in a $H_2O_2$-rich atmosphere at $H_2O_2$/resin ratios of 10, 15, and 20 until it was completely decomposed; and the final $H_2O_2$/resin ratio was determined on the basis of the total amount of hydrogen peroxide that was consumed in the overall treatment, including the first and second decomposition. When the uncrushed granular resin was supplied, the final $H_2O_2$/resin ratio could not be reduced to less than about 7.5 but as for the crushed resin, the final $H_2O_2$/resin ratio could be reduced to approximately 6. This data demonstrates specifically the effectiveness of crushing a granular resin feed before it is subjected to oxidative decomposition.

When a granular ion-exchange resin is subjected to oxidative decomposition with the $H_2O_2$/resin ratio held at 10 or below, foaming may tend to occur in the reaction vessel, although this problem will not occur if the $H_2O_2$/resin ratio is about 20. The principal cause of the foaming problem is the production of fusible organic matters, $CO_2$ gas and other substances during the oxidative decomposition of the ion-exchange resin, and if the $H_2O_2$/resin ratio is 6 or below, the unreacted resin will be discharged from the reaction vessel together with the gas evolved in it. Conventionally, the overflowing unreacted resin is either returned to the reaction vessel or introduced into a separate vessel for performing another cycle of decomposition treatment. If the granular ion-exchange resin is crushed into finer particles in accordance with the present invention, it can be subjected to oxidative decomposition at a very low $H_2O_2$/resin ratio (=4), and yet the occurrence of foaming is negligible. Therefore, in accordance with the present invention, oxidative decomposition of ion-exchange resins can be accomplished efficiently without making any provisions against the foaming problem.

There is no particular limitation on the concentration of an aqueous solution of hydrogen peroxide that is added to the reaction system for performing oxidative decomposition of an ion-exchange resin according to the present invention, and a commercial product of 30% or 60% $H_2O_2$ may be employed, either as such, or after being diluted to an appropriate degree. The ion-exchange resin is subjected to oxidative decomposition in the form of an aqueous dispersion or suspension. The volume of the reaction solution may be suitably selected from the range of about 10 to 30 ml per gram of the resin in a dry state. Oxidative decomposition of the resin may be carried out with either a continuous or a batch reactor. Decomposition can be accomplished if the reaction temperature is within the range of from ambient temperatures to 100° C. and temperatures of at least 90° C. are preferably employed in order to attain a higher efficiency of decomposition. The reaction vessel is preferably equipped with a stirrer for several reasons, one of which is to attain an increased efficiency of reaction In addition to these conditions, it is particularly desirable that the $H_2O_2$/resin ratio is set to a value of no higher than 10 in order to allow the advantages of the present invention, in particular, the reduction in the required amount of hydrogen peroxide, to be exhibited to the fullest extent.

As described in the foregoing pages, one embodiment of the present invention provides a method for oxidative decomposition of a waste granular ion-exchange resin, in which the waste resin is first crushed into finer particles before it is subjected to the step of oxidative decomposition with hydrogen peroxide in the presence of a mixed catalyst of iron and copper ions. As compared with the prior art method in which the granular waste resin in a bulk form is immediately subjected to oxidative decomposition, the method of the present invention offers the following advantages: (1) the amount of hydrogen peroxide consumed in the step of oxidative decomposition and the time required for completing resin decomposition are reduced markedly, and yet the resin can be decomposed with high efficiency; and (2) the occurrence of foaming during oxidative decomposition is suppressed to a negligible level.

Therefore, by employing the method of the present invention, waste ion-exchange resins that occur in large quantities in atomic energy plants or facilities can be decomposed in an efficient and economical manner.

The objects of the present invention can be attained in an even more efficient manner by employing still another embodiment, in which the reaction vessel in a reactor equipped with mixing and crushing capabilities is charged with a waste ion-exchange resin, an oxidizing agent and a decomposition catalyst, and the resin is oxidatively decomposed by crushing the resin into fine particles as it is mixed with the chemicals. In this embodiment, the following advantages are attained contact between the waste ion and the chemicals is promoted; the consumption of chemicals and the size of the reactor are reduced, and yet the rate of decomposition of the resin and the efficiency of reaction are improved; and in addition, the resin is converted into a form that can be easily treated in subsequent stages of drying and solidifying the decomposition products and other residues.

Figure 18:
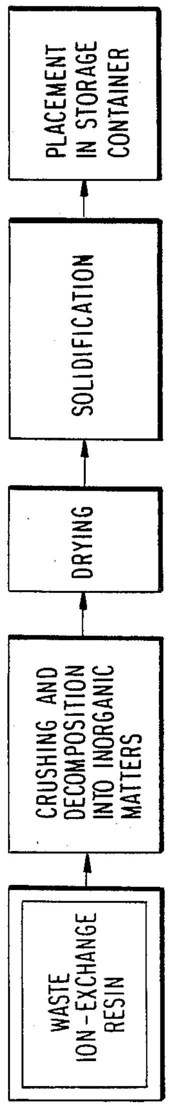
FIG. 18 is a flowsheet of a method of decomposing a waste ion-exchange resin according to still another embodiment of the present invention.
Figure 19:
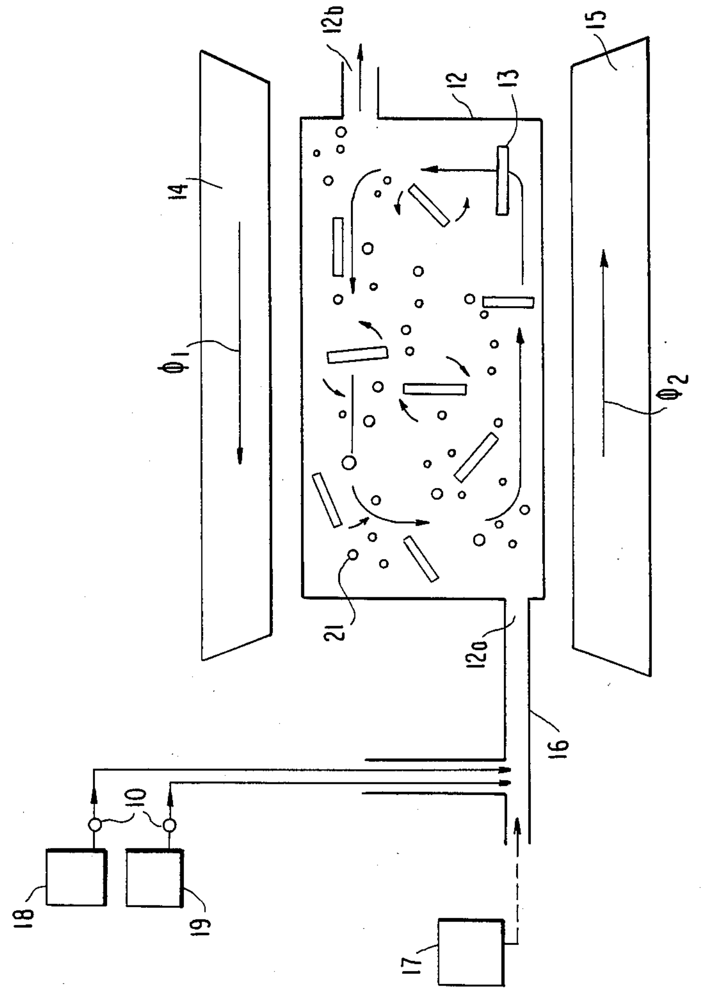
FIG. 19 is a schematic drawing of a reactor used to crush the waste resin into fine particles and decomposing them into inorganic matters in the process shown in FIG. 18.
Figure 20:
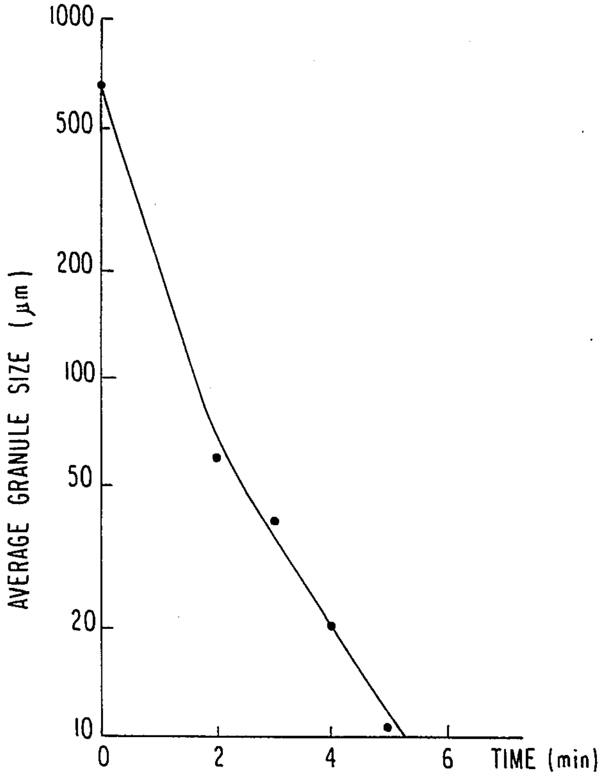
FIG. 20 is a characteristic graph showing the ability of the reactor of FIG. 19 to crush the waste resin into fine particles.
Figure 21:
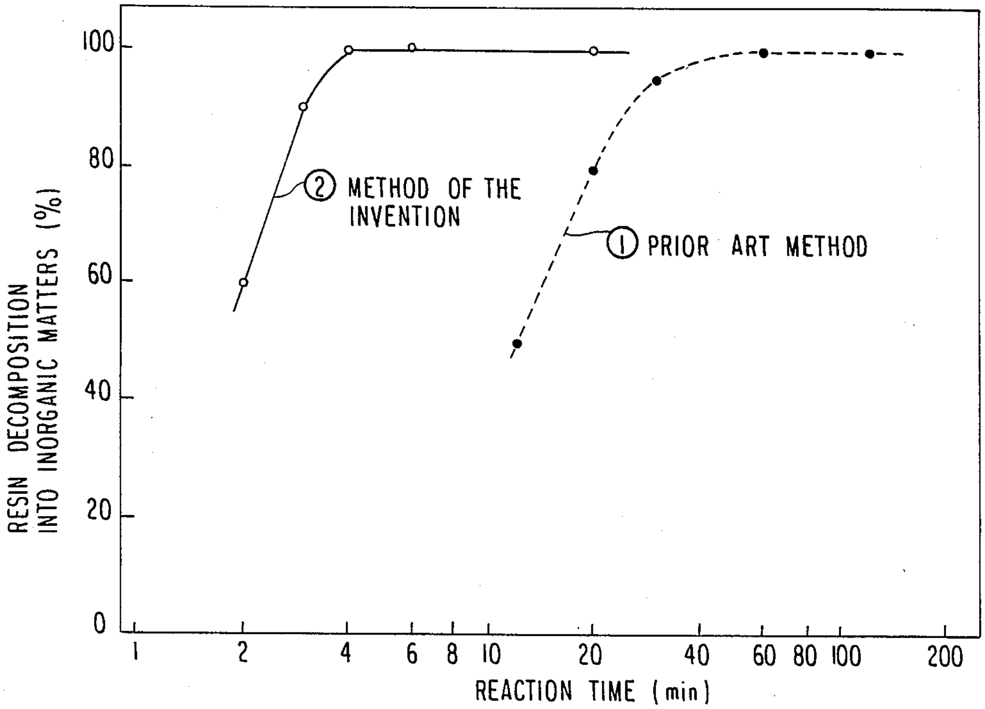
FIG. 21 is a characteristic graph showing the decomposing capability of the method of the present invention using the reactor of FIG. 19 as compared with a prior art technique.

FIG. 18 is a flowsheet of the method of decomposing a waste ion-exchange resin according to the above-described embodiment of the present invention. FIG. 19 is a schematic drawing of a reactor used to crush the resin into fine particles and decomposing them into inorganic matters in the process shown in FIG. 18. FIG. 20 is a characteristic graph showing the ability of the reactor of FIG. 19 to crush the waste resin into fine particles. FIG. 21 is a characteristic graph showing the decomposing capability of the method of the present invention in comparison with the prior art technique.

Referring to the flowsheet of FIG. 18, the waste resin is transported in the form of a slurry and supplied into the reactor provided for performing the step of crushing the resin into fine particles and decomposing them into inorganic matters. The reactor is also fed with the necessary chemicals (i.e., an oxidizing agent and a decomposition catalyst). In the reactor, the resin is crushed into fine particle, and, at the same time, it is mixed with the chemicals under stirring so as to be oxidatively decomposed into inorganic matters. The slurry containing the decomposition products of the waste resin and other residues such as the sludge formed of the decomposed catalyst is recovered from the reaction vessel and transferred into the subsequent drying step, in which the decomposition products and other residues are dried with a suitable device, such as a drum dryer, centrifugal thin-film dryer, etc., to form a powder having a water content of about 1 to 5 wt%. The resulting dry powder is then transferred to a solidification step which is performed for the purpose of yielding a waste product that can be disposed of and stored for many years in a highly stable form. While various techniques are available for attaining this purpose, two methods are typically used: adding a few percent of an inorganic binder and compacting the residue under pressure; or adding a gelling agent or other crosslinking agents to the residue, which is then confined in plastics. The solidified waste residue is placed in a storage container such as a steel drum and stored in an air-conditioned building for a prescribed number of years with the leakage of radioactivity and other parameters being constantly checked with radiation monitors The construction and operation of the reactor used in the step of crushing the waste resin into fine particles and decomposing them into an inorganic matter are hereunder described with reference to FIG. 19. The reaction vessel 12, which is formed of a highly corrosion-resistant nonmagnetic material, is closed except that it has an inlet 12*a* and an outlet 12*b* for the resin feed at opposite ends. The vessel 12 contains in its interior a number of spindle-shaped working media 13 that are formed of a ferromagnetic material. Two moving field generators 14 and 15 are placed on top and bottom of the vessel 12. Moving field generators are well known as linear motors and each consists of an iron core equipped with a multi-phase AC winding that is disposed along the magnetic poles of the core. When current is supplied to the multi-phase AC windings, moving magnetic fields are induced in opposite directions as indicated by arrows $\phi_1$ and $\phi_2$. The inlet 12*a* of the reaction vessel 12 is connected to a conduit 16 which in turn is connected to a waste resin feeder 17. Hydrogen peroxide as an oxidizing agent is held in a reservoir 18 and a decomposition catalyst (a mixture of iron and copper ions) is placed in a reservoir 19. Each of the oxidizing agent and the catalyst is supplied to halfway of the conduit by means of a pump 20.

As already mentioned, when current is applied to the moving field generators 14 and 15, moving magnetic fields ($\phi_1$, $\phi_2$) are induced in opposite directions and will act on the reaction vessel 12. An electromagnetic force is then produced in the vessel 12 by the interaction between the working media 13 and the moving fields and as a result, the working media 13 in the vessel 12 are lifted and start to revolve about their center of gravity while moving around in the vessel 12 in either direction of the movement of the magnetic fields. When a waste resin is supplied into the vessel 12 at this stage, the resin is brought into violent contact with the working media 13 and is crushed into fine particles.

The crushing power of the electromagnetic force is very strong as will be understood from FIG. 20 which shows the results of the resin crushing experiment conducted by the present inventors. Clearly, a granular waste resin having a particle size of 650 μm could be crushed to a very small size of about 10 μm by a treatment that lasted for only about 5 minutes. In addition to crushing the waste resin into fine particles, the working media 13 also afford the capabilities of stirring and mixing the resin as a result of their random movement in the vessel 12.

When the reaction vessel 12, which is filled not only with a slurry of waste resin adjusted to a concentration of about 5 to 15 wt% but also with appropriate amounts of hydrogen peroxide and catalyst, is placed under the action of moving magnetic fields, the working media 13 start to move around in the reaction vessel 12 to perform crushing and mixing operations simultaneously on the waste resin 21 so that the latter is divided into very fine particles which are almost like colloidal particles while, at the same time, they are intimately mixed with the chemicals to be decomposed into inorganic matters. In the process of treatment described above, the waste resin is first divided into fine particles as a result of violent contact with the working media and its specific surface area is sufficiently increased to provide a greater chance of contact with the chemicals. In addition, the stirring and mixing actions which occur simultaneously with the crushing action decreases the thickness of the boundary liquid film of the chemical solution around the waste resin so that it will readily diffuse toward the crushed waste resin. Furthermore, the chemicals will react with the waste resin as soon as they contact each other and the resin will undergo rapid oxidative decomposition into inorganic matters such as $CO_2$ and water. Besides these decomposition products, residues containing the sludge of catalyst such as iron, etc., are also yielded as a result of the decomposition of the resin. The resulting slurry containing the decomposition products and other residues is discharged from the reaction vessel 12 through outlet 12*b* and transferred to the subsequent drying step.

The process by which waste cation- and anion-exchange resins are decomposed oxidatively with hydrogen peroxide is roughly divided into two stages, the first stage at which a solid waste resin is liquefied and the second stage at which the liquefied organic matter undergoes a chemical reaction to be decomposed into inorganic matter. In this process, more of the hydrogen peroxide supplied is consumed in the first stage than in the second stage. However, if the reactor shown in FIG. 19 is used, the waste resin which is undergoing oxidative decomposition is simultaneously crushed into very fine particles which are almost like colloidal particles, and, as a result, the reaction for the first stage is rapidly carried out. This leads to a marked reduction not only in the reaction time, but also in the consumption of hydrogen peroxide.

In order to demonstrate this effect of the method of the present invention in comparison with the prior art system, the present inventors carried out an experiment of converting a waste resin into inorganic matter by oxidative decomposition with hydrogen peroxide in the presence of a catalyst made of iron and copper ions in accordance with the two methods. The profile of the efficiency of conversion to inorganic matters vs the reaction time is shown in FIG. 21, in which characteristic curve (1) refers to the prior art method and curve (2) to the method of the present invention. In the prior art method, two types of reactors were employed, one being the bubble column type and the other being the mechanical agitator type, but they were substantially equal to each other in their performances. In the method of the present invention, an electromagnetic reactor of the type shown in FIG. 19 was used. As FIG. 21 clearly shows, the method of the present invention achieved almost 100% conversion of the waste resin into organic matters by a reaction that lasted for only about 4 minutes, but the prior art method took as long as about 60 minutes to attain the same level of conversion. It was therefore obvious that a significant improvement in the efficiency of reaction was achieved by employing the method of the present invention. Needless to say, the exact time required for the conversion reaction to be completed will vary with the specific properties of each waste resin but even if this point is taken into consideration, the method of the present invention is capable of decomposing waste resins of widely varying properties to commercially acceptable levels by performing the reaction for about 2 to 30 minutes. A further advantage of the reactor shown in FIG. 19 is that it has no mechanical seals, unlike conventional crushers and stirrers, and in this respect, it is suitable for use in the treatment of radioactive wastes which must be handled in such a way that no leakage of radioactivity will occur. This advantage leads to easy maintenance and reliable management of the operation of waste treatment facilities.

The foregoing description is directed to the use of the present invention for the purpose of decomposing radioactive ion-exchange resins originating from atomic energy facilities but it should of course be understood that the concept of the present invention can equally be applied to the decomposition of spent waste ion-exchange resins occurring in other industrial fields.

In accordance with one embodiment of the present invention described above for decomposing a waste ion-exchange resin with an oxidizing agent in the presence of a decomposition catalyst, the reaction vessel in a reactor equipped with mixing and crushing capabilities is charged with the waste resin, oxidizing agent and the decomposition catalyst, and the resin is decomposed by crushing the resin into fine particles as it is mixed with the chemicals. This has the advantage of efficiently decomposing the waste resin into inorganic matters in a shorter period of time using smaller amounts of chemicals. In addition, the waste resin treated by this method is reduced in volume and can be stored with less strict requirements for maintenance and management.

While the invention has been described in detail and with reference to specific embodiments thereof, it will be apparent to one skilled in the art that various changes and modifications can be made therein without departing from the spirit and scope thereof.

What is claimed is:

1. A method of oxidatively decomposing a radioactive ion-exchange resin containing an anion-exchange resin with hydrogen peroxide used as an oxidizing agent in the presence of iron and copper ions used as catalysts, wherein the weight ratio of hydrogen peroxide to the ion-exchange resin, that is, the ratio of the net weight of hydrogen peroxide of the dry weight of the ion-exchange resin containing an anion-exchange resin, is no higher than 17 and citric acid ions are preliminarily adsorbed on the radioactive ion-exchange resin before it is subjected to decomposition treatment or citric acid ions are co-present with the radioactive ion-exchange resin in the oxidatively decomposing system.

2. A method according to claim 1, wherein the concentration of iron ions is within the range of from 0.005 M to 0.02 M.

3. A method according to claim 1, wherein the concentration of iron ions is within the range of from 0.0005 M to 0.02 M and that of copper ions is within the range of from 0.002 M to 0.15 M.

4. A method according to claim 1, wherein the pH of the reaction system is adjusted to be within the range of from 1 to 5.

5. A method according to claim 1, wherein the radioactive ion-exchange resin is crushed into fine particles before the addition of the oxidizing agent and the catalysts.

6. A method according to claim 1, wherein the radioactive ion-exchange resin is crushed into fine particles as it is mixed with the oxidizing agent and the catalysts.

* * * * *